(12) United States Patent
Ashraf et al.

(10) Patent No.: US 10,595,073 B2
(45) Date of Patent: Mar. 17, 2020

(54) TECHNIQUES FOR AUTHORIZING CONTROLLER DEVICES

(71) Applicant: Apple Inc., Cupertino, CA (US)

(72) Inventors: Zaka Ur Rehman Ashraf, Pleasanton, CA (US); Anush G. Nadathur, San Jose, CA (US); Jared S. Grubb, San Francisco, CA (US); Srinivas Rama, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/140,470

(22) Filed: Sep. 24, 2018

(65) Prior Publication Data
US 2019/0373303 A1 Dec. 5, 2019

Related U.S. Application Data

(60) Provisional application No. 62/679,922, filed on Jun. 3, 2018.

(51) Int. Cl.
*H04N 21/422* (2011.01)
*G10L 15/26* (2006.01)

(52) U.S. Cl.
CPC ....... *H04N 21/42225* (2013.01); *G10L 15/26* (2013.01); *H04N 21/42203* (2013.01); *H04N 21/42208* (2013.01)

(58) Field of Classification Search
CPC ................... H04N 2005/4405; G08C 2201/21
See application file for complete search history.

(56) References Cited

U.S. PATENT DOCUMENTS 5,059,871 A 1/1991 Pearlman et al.
5,086,385 A 2/1992 Launey
(Continued)

FOREIGN PATENT DOCUMENTS

CN 101527911 A 9/2009
CN 102387501 A 3/2012
(Continued)

OTHER PUBLICATIONS

Wu, Thomas, "The Secure Remote Password Protocol." Computer Science Department, Stanford University. Nov. 11, 1997. 1998 Internet Society Symposium on Network and Distributed System Security. 17 pages.
(Continued)

*Primary Examiner* — Paulos M Natnael
(74) *Attorney, Agent, or Firm* — Kilpatrick, Townsend and Stockton LLP

(57) ABSTRACT

Embodiments of the present disclosure present devices, methods, and computer readable medium for enabling controller device to control proprietary digital media players, network accessories, and virtual assistants, providing an overall improved user experience. The techniques disclosed herein reduce clutter because a single controller can control various different devices and accessories. The techniques discloses also can include identifying a change in the configuration information for the computing device. The technique for accessory control can include transmitting updated configuration information for the controller, the configuration information associating a function for the computing device with a user interface element value for the controller.

17 Claims, 11 Drawing Sheets

(56) References Cited

U.S. PATENT DOCUMENTS

| | | | |
|---|---|---|---|
| 5,471,190 A | 11/1995 | Zimmermann | |
| 5,621,662 A | 4/1997 | Humphries et al. | |
| 5,907,279 A | 5/1999 | Bruins et al. | |
| 6,756,998 B1 | 6/2004 | Bilger | |
| 6,834,208 B2 | 12/2004 | Gonzales et al. | |
| 6,912,429 B1 | 6/2005 | Bilger | |
| 6,980,080 B2 | 12/2005 | Christensen et al. | |
| 7,047,092 B2 | 5/2006 | Wimsatt | |
| 7,139,716 B1* | 11/2006 | Gaziz | H04L 12/2803 704/275 |
| 7,394,393 B2 | 7/2008 | Zhang et al. | |
| 7,415,310 B2 | 8/2008 | Bovee et al. | |
| 7,574,417 B1 | 8/2009 | McGreevy et al. | |
| 7,912,447 B2 | 3/2011 | Bennett, III et al. | |
| 8,042,048 B2 | 10/2011 | Wilson et al. | |
| 8,156,334 B2 | 4/2012 | Ho | |
| 8,190,275 B2 | 5/2012 | Chang | |
| 8,261,089 B2 | 9/2012 | Leon Cobos et al. | |
| 8,375,118 B2* | 2/2013 | Hao | G05B 15/02 709/223 |
| 8,422,401 B1 | 4/2013 | Choong et al. | |
| 8,473,325 B2 | 6/2013 | Barnhill, Jr. et al. | |
| 8,516,087 B2* | 8/2013 | Wilson | H04L 12/282 709/217 |
| 8,670,749 B2 | 3/2014 | Pratt, Jr. et al. | |
| 8,671,099 B2 | 3/2014 | Kapoor | |
| 8,750,797 B2 | 6/2014 | Ketari | |
| 9,467,119 B2* | 10/2016 | Lee | G06F 3/0346 |
| 9,544,075 B2 | 1/2017 | Altman et al. | |
| 9,575,472 B1 | 2/2017 | Clayton et al. | |
| 9,680,646 B2* | 6/2017 | Nadathur | H04L 67/141 |
| 9,979,625 B2* | 5/2018 | McLaughlin | H04W 12/04 |
| 10,177,933 B2* | 1/2019 | Burks | G08C 17/02 |
| 2002/0044042 A1* | 4/2002 | Christensen | G05B 15/02 340/3.54 |
| 2002/0095568 A1 | 7/2002 | Norris et al. | |
| 2002/0180581 A1* | 12/2002 | Kamiwada | H04L 12/2803 340/5.2 |
| 2003/0225568 A1* | 12/2003 | Salmonsen | H04L 12/283 703/27 |
| 2004/0049797 A1* | 3/2004 | Salmonsen | G06F 13/40 725/132 |
| 2004/0075642 A1* | 4/2004 | Kisliakov | G06F 1/1626 345/156 |
| 2004/0192206 A1 | 9/2004 | Hirvonen | |
| 2004/0260407 A1* | 12/2004 | Wimsatt | G05B 15/02 700/19 |
| 2006/0168618 A1* | 7/2006 | Choi | G08C 17/02 725/37 |
| 2007/0112939 A1* | 5/2007 | Wilson | H04L 12/2807 709/219 |
| 2007/0139214 A1* | 6/2007 | Andersen | G08C 17/02 340/12.29 |
| 2008/0009324 A1 | 1/2008 | Patel | |
| 2008/0222711 A1 | 9/2008 | Michaelis et al. | |
| 2008/0229402 A1 | 9/2008 | Smetters et al. | |
| 2008/0238661 A1 | 10/2008 | Camp et al. | |
| 2008/0253772 A1* | 10/2008 | Katsuyama | G08C 17/02 398/106 |
| 2008/0320190 A1* | 12/2008 | Lydon | G06F 13/387 710/106 |
| 2009/0222659 A1 | 9/2009 | Miyabayashi | |
| 2009/0307255 A1 | 12/2009 | Park | |
| 2009/0326800 A1 | 12/2009 | Kalaboukis | |
| 2010/0011377 A1* | 1/2010 | Imai | G06F 9/445 719/318 |
| 2010/0019920 A1 | 1/2010 | Ketari | |
| 2010/0262829 A1 | 10/2010 | Brown | |
| 2011/0153279 A1 | 6/2011 | Zhang et al. | |
| 2011/0195664 A1 | 8/2011 | Keirstead et al. | |
| 2012/0054493 A1 | 3/2012 | Bradley | |
| 2012/0096503 A1 | 4/2012 | Slothouber et al. | |
| 2012/0133841 A1* | 5/2012 | Vanderhoff | H04N 21/42226 348/734 |
| 2012/0324124 A1 | 12/2012 | Locker et al. | |
| 2013/0029596 A1 | 1/2013 | Preston | |
| 2013/0034230 A1 | 2/2013 | Takahashi | |
| 2013/0101121 A1 | 4/2013 | Nordholt et al. | |
| 2013/0169407 A1 | 7/2013 | Chen et al. | |
| 2013/0198516 A1 | 8/2013 | Fenton et al. | |
| 2013/0217333 A1 | 8/2013 | Sprigg et al. | |
| 2013/0225132 A1 | 8/2013 | Payan et al. | |
| 2014/0006587 A1 | 1/2014 | Kusano | |
| 2014/0022061 A1 | 1/2014 | Apte et al. | |
| 2014/0085093 A1 | 3/2014 | Mittleman et al. | |
| 2014/0098247 A1 | 4/2014 | Rao et al. | |
| 2014/0118148 A1 | 5/2014 | Edlund | |
| 2014/0143695 A1 | 5/2014 | Sundemeyer et al. | |
| 2014/0222954 A1 | 8/2014 | Vaccari | |
| 2014/0316991 A1* | 10/2014 | Moshal | G06Q 20/14 705/64 |
| 2014/0321297 A1 | 10/2014 | Yee et al. | |
| 2015/0222517 A1* | 8/2015 | McLaughlin | H04L 9/3247 713/156 |
| 2015/0237071 A1 | 8/2015 | Maher et al. | |
| 2015/0334516 A1 | 11/2015 | Shon et al. | |
| 2015/0341184 A1 | 11/2015 | Tatzel et al. | |
| 2015/0350031 A1 | 12/2015 | Burks et al. | |
| 2015/0351145 A1* | 12/2015 | Burks | G08C 17/02 455/41.3 |
| 2016/0100369 A1 | 4/2016 | Chhabra | |
| 2016/0315688 A1 | 10/2016 | Bhargava et al. | |
| 2016/0359629 A1* | 12/2016 | Nadathur | H04L 67/141 |

FOREIGN PATENT DOCUMENTS

| | | |
|---|---|---|
| EP | 1125414 A2 | 8/2001 |
| EP | 1133120 A2 | 12/2001 |
| EP | 1381201 A2 | 1/2004 |
| EP | 1659739 A2 | 5/2006 |
| EP | 2148308 A2 | 1/2010 |
| EP | 2784986 A1 | 10/2014 |
| EP | 2881676 A1 | 6/2015 |
| GB | 2339367 A | 1/2000 |
| JP | 5474238 B1 | 4/2014 |
| TW | 200937931 A | 9/2009 |
| TW | 201250481 A | 12/2012 |
| WO | 2013/049007 A1 | 4/2013 |
| WO | 2013/174540 A1 | 11/2013 |
| WO | 2013/0184108 A1 | 12/2013 |
| WO | 2014/004133 A1 | 1/2014 |
| WO | 2014/020880 A1 | 2/2014 |
| WO | 2015120161 | 8/2015 |
| WO | 2015184382 | 12/2015 |
| WO | 2015184387 | 12/2015 |

OTHER PUBLICATIONS

Taiwanese Application No. 104117507, Office Action dated May 5, 2016, 6 pages.

International Preliminary Report on Patentability dated Aug. 18, 2016 in International Application No. PCT/US2015/014639. 7 pages.

GATT Specifications, [online], Bluetooth Development Portal, [retrieved Apr. 24, 2015], retrieved from the Internet: <URL: https://developer.bluetooth.org/gatt/Pages/default.aspx>, 1 page.

GATT Descriptors, [online], Bluetooth Development Portal, [retrieved Apr. 24, 2015], retrieved from the Internet: <URL: https://developer.bluetooth.org/gatt/descriptors/Pages/DescriptorsHomePage.aspx >, 1 page.

GATT Services, [online], Bluetooth Development Portal, [retrieved Apr. 24, 2015], retrieved from the Internet: <URL: https://developer.bluetooth.org/gatt/services/Pages/ServicesHome.aspx>, 1 page.

GATT Profiles, [online], Bluetooth Development Portal, [retrieved Apr. 24, 2015], retrieved from the Internet: <URL: https://developer.bluetooth.org/gatt/profiles/Pages/ProfilesHome.aspx>, 1 page.

Rosenberg, J., "A Data Model for Presence," Cisco Systems, Jul. 2006, [retrieved Apr. 24, 2015], retrieved from the Internet: <URL: https://tools.ietf.org/html/rfc4479>, 35 pages.

(56) References Cited

OTHER PUBLICATIONS

Epson 802.11n/Bluetooth 2.1 Wireless Interfaces, Datasheet, Epson America, Inc., 2013, 2 pages.

Asensio, Angel, et al., "Protocol and Architecture to Bring Things into Internet of Things," Hindawi Publishing Corporation, International Journal of Distributed Sensor Networks, Apr. 13, 2014, vol. 2014, Article ID 158252, 19 pages.

Isomaki, Markus, et al., "On interworking between rapidly evolving Internet of Things and Open Web Platform," Feb. 20, 2014, [online], Word Wide Web Consortium, <URL: http://www.w3.org/2014/02/wot/papers/isomaki.pdf>, 5 pages.

International Application No. PCT/US2016/035208, International Search Report and Written Opinion dated Aug. 11, 2016, 13 pages.

Andersson, Mats, "Use case possibilities with Bluetooth low energy in IoT applications," White Paper, May 20, 2015, [online], <URL: www.u-blox.com>, 16 pages.

Echeverria, Juan Jose, et al., "WebTag: Web Browsing into Sensor Tags over NFC," Sensors, 2012, vol. 12, pp. 8675-8690.

Koch, Ed, et al., "Hardware/Software Solution Unifying DALI, IBECS, and BACnet Final Report," [online], Lawrence Berkeley National Laboratory, 2004, LBNL-57686, <URL: http://eetd.lbl.gov/node/51279>, 25 pages.

International Search Report and Written Opinion dated Aug. 7, 2015 in PCT/US2015/033376, 11 pages.

International Preliminary Report on Patentability dated Dec. 15, 2016 in International Application No. PCT/US2015/033376. 9 pages.

Non-Final Office Action dated Jun. 23, 2016 in U.S. Appl. No. 14/725,891, 16 pages.

Final Office Action dated Mar. 13, 2017 in U.S. Appl. No. 14/725,891. 20 pages.

Notice of Allowance dated Jul. 18, 2018 in U.S. Appl. No. 14/725,891. 10 pages.

Office Action and Search Report dated Mar. 17, 2017 in ROC (Taiwan) Patent Application No. 10410409. 4 pages (includes English translation of non-compliant subject matter or essential features in Claim—Rule 18.2).

Fibaro, "Home Intelligence Advanced User's Guide.". 8.V111.2012 ver. 1.02 \beta. Aug. 14, 2012. 102 pages.

Honeywell, "Tuxedo Touch WIFI Home Automation System Installation and Setup Guide." Aug. 4, 2012. 48 pages.

Non-Final Office Action dated Jun. 2, 2017 in U.S. Appl. No. 14/725,912. 18 pages.

Behrang Fouladi, "Security Evaluation of the Z-Wave Wireless Protocol." Oct. 5, 2012, 6 pages.

* cited by examiner

TECHNIQUES FOR AUTHORIZING CONTROLLER DEVICES

CROSS-REFERENCES TO RELATED APPLICATIONS

This application incorporates by reference commonly-owned U.S. Provisional Application Ser. No. 62/679,922, filed Jun. 3, 2018 and entitled "Techniques for Authorizing Controller Devices," in its entirety and for all purposes. This application incorporates by reference commonly-owned U.S. patent application Ser. No. 15/064,406, filed Mar. 8, 2016, entitled, "Relay Service for Communications Between Controllers and Accessories," which claims priority to U.S. Provisional Application No. 62/171,995, filed Jun. 5, 2015, entitled "Relay Service for Communications Between Controllers and Accessories," the disclosures of which are hereby incorporated by reference in their entirety for all purposes.

The present disclosure is also related to the following U.S. Patent Applications: U.S. application Ser. No. 14/614,914, filed Feb. 5, 2015; U.S. application Ser. No. 14/725,891, filed May 29, 2015; and U.S. application Ser. No. 14/725,912, filed May 29, 2015. The disclosures of these applications are also incorporated by reference herein in their entirety for all purposes.

This application incorporates by reference commonly-owned U.S. patent application Ser. No. 62/575,373, filed Oct. 21, 2017, entitled "Personal Domain for a Virtual Assistant System on a Communal Device," in its entirety and for all purposes.

BACKGROUND

Many of the entertainment devices (e.g., televisions, digital media players, digital video disc, Blu-ray players, etc.) used in homes utilize remote controls. Other non-entertainment devices such as blinds, lights, garage doors, thermostats, etc., also utilize remote controls. The amount of remote control devices required to control all of these devices can result in clutter and an overall poor user experience. Often, sitting down to watch TV or a movie requires shuffling between several remotes, switching inputs, and powering-on multiple components at the same time. Controllers can be configured to control multiple devices. Therefore, homeowners need to retain several remote devices to control these devices, resulting in clutter and an overall poor user experience.

SUMMARY

Embodiments of the present disclosure can provide devices, methods, and computer-readable medium for enabling controller devices to control proprietary digital media players, home network accessories, and virtual assistants, providing an overall improved user experience. The techniques disclosed herein reduce clutter and improve efficiency for home networking because a single controller can control various different accessories.

In various embodiments, the technique for accessory control can include receiving, by a computing device for a home network, a network code for adding a controller. The network code can be entered by a user via a user interface of an application for the home network. The technique for accessory control can include transmitting, by the computing device, a first signal to the controller, the first signal configured to register the controller to receive configuration information from the computing device. The technique for accessory control can include transmitting, by the computing device, a second signal to the controller, the second signal comprising the configuration information for the controller, the configuration information associating a function for the computing device with a user interface element value for the controller. The technique for accessory control can include receiving, by the computing device, a third signal from the controller, the third signal indicating activation of a selected user interface element on the controller. The technique for accessory control can include performing, by the computing device, the function associated with the selected user interface element.

In various embodiments, the technique for accessory control can include receiving, by the computing device, information (e.g., an information packet) via the third signal. The information packet can include recorded audio information from the controller. The technique for accessory control can include translating, by the computing device, the information packet into a partial transcript of text, where the partial transcript of text includes one or more characters of text. The technique for accessory control can include preparing for display, at the computing device, the partial transcript of text. The technique for accessory control can include performing, by the computing device, one or more functions based at least in part on execution of one or more instructions associated with the partial transcript of text. The technique can include displaying the partial transcript of text.

In various embodiments, the technique for accessory control can include identifying, by the computing device, a change in the configuration information for the computing device. The technique for accessory control can include transmitting, by the computing device, a fourth signal that includes revised configuration information for associating functions of the computing device with the user interface element value for the controller.

In various embodiments, the technique for accessory control can include authorizing the controller to control one or more accessories of various types that are wirelessly connected to the computing device.

In various embodiments, the technique for accessory control can include synchronizing the control of the one or more accessories such that a command from the controller will perform a related function for each of a same type of accessory.

In various embodiments, the technique for accessory control can include causing an interface of the controller to display representations of the one or more accessories on a display of the controller.

In various embodiments, the technique for accessory control can include receiving, from the controller, authorization for the computing device to control one or more accessories of various types that are wirelessly connected to the controller. The technique can include synchronizing the control of the one or more accessories such that a command from the computing device will perform a related function for each of a same type of accessory. The technique can include providing an interface for a user to select the one or more accessories on the computing device.

In various embodiments, the technique for accessory control can include receiving, by the computing device, a request from the controller to open a channel. In some embodiments, the channel can be bi-directional. The technique can include opening, by the computing device, the channel for reception of the third signal containing digital audio data. The technique can include transmitting, by the computing device, a fifth signal to the controller, the fifth signal including a transmit identifier, a status, an address, and a channel identifier. The technique can include receiving, by the computing device, an information packet via the third signal, the information packet including digital audio data from the controller.

In various embodiments, the techniques for accessory control can be stored as a plurality of instructions in a computer readable medium.

In various embodiments, the techniques for accessory control can be incorporated in a computing device, including one or more memories, and one or more processors in communication with the one or more memories and configured to execute instructions stored in the one or more memories.

The following detailed description together with the accompanying drawings will provide a better understanding of the nature and advantages of the present disclosure.

DETAILED DESCRIPTION

Certain embodiments of the present disclosure relate to devices, computer-readable medium, and methods for implementing various techniques for controlling accessories. In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. The present disclosure describes devices and methods for enabling controller device to control proprietary digital media players, network accessories, and virtual assistants.

I. Example Environment

Figure 1:
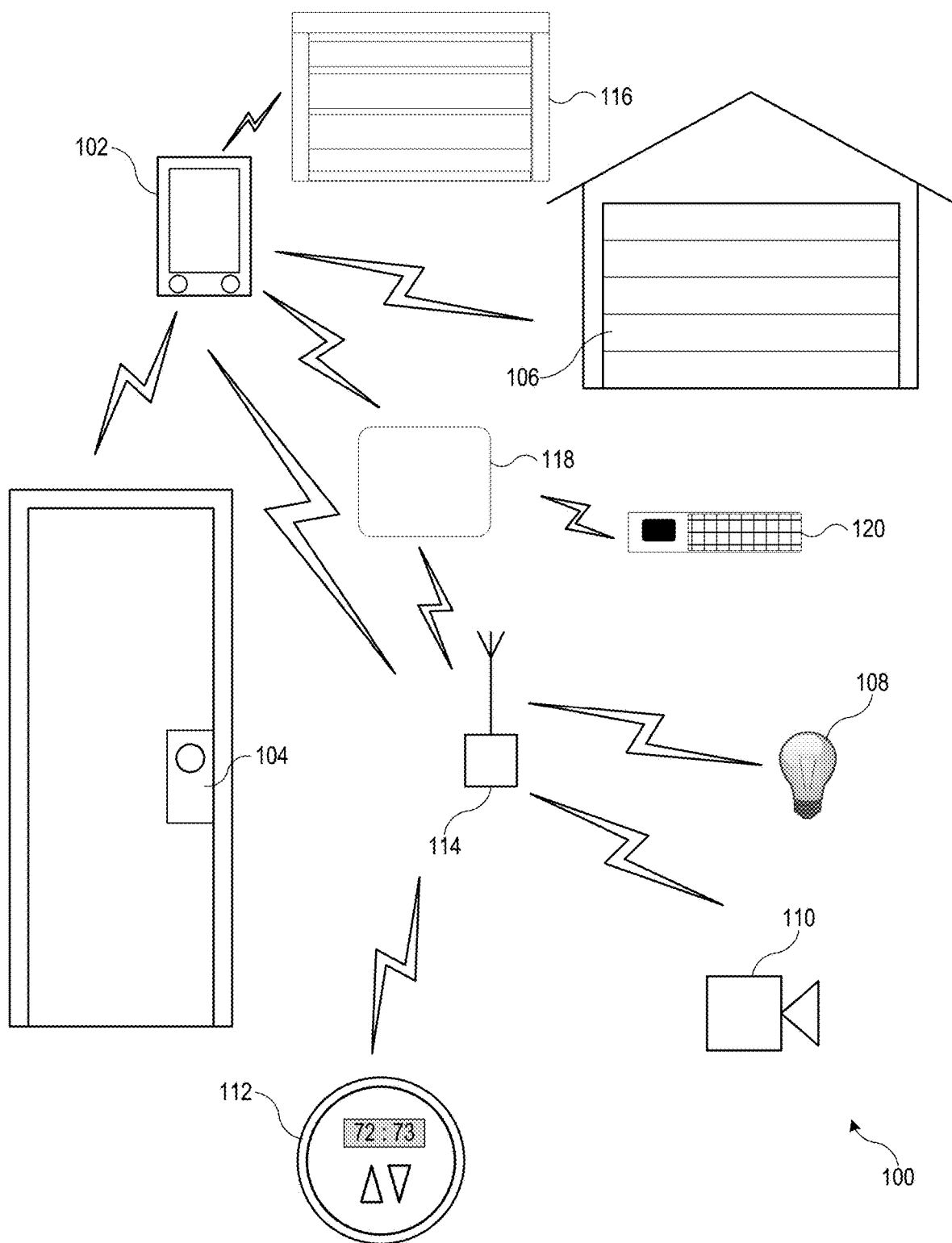
FIG. 1 illustrates a network environment according to an embodiment of the present disclosure.

FIG. 1 shows a network environment 100 according to an embodiment of the present disclosure. In some embodiments, the network environment 100 can be a home network. Network environment 100 includes a controller 102 that can communicate with various accessory devices (also referred to as accessories) located in the environment. Controller 102 can include, for example, a desktop computer, laptop computer, tablet computer, smart phone, wearable computing device, personal digital assistant, or any other computing device or set of devices that can be capable of communicating command-and-control messages to accessories (e.g., as described in above-referenced U.S. application Ser. No. 14/614,914) and presenting a user interface to allow a user to indicate desired operations on the accessories. In some embodiments, controller 102 can be implemented using multiple discrete devices. For example, there can be a base station that communicates with accessories and that can be installed in a fixed location in environment 100, and one or more mobile remote-control stations (e.g., a handheld or wearable device such as a mobile phone, tablet computer, smart watch, eyeglasses, etc.) that provide a user interface and communicate with the base station to effect control over accessories. In some embodiments, the base station can function as a coordinator or proxy as described in above-referenced U.S. application Ser. No. 14/725,891.

Any type of accessory device can be controlled. Examples of accessory devices include door lock 104, garage door system 106, light fixture 108, security camera 110, and thermostat 112. In some instances, controller 102 can communicate directly with an accessory; for instance, controller 102 is shown communicating directly with door lock 104, garage door system 106, and window blinds 116. In other instances, controller 102 can communicate via an intermediary. For instance, controller 102 is shown communicating via a wireless network access point 114 with accessories such as 108, 110, 112, 118 that are on a wireless network provided by access point 114. As noted above, in some embodiments, controller 102 can include a base station, and base station functionality can be integrated into access point 114 or into one of the accessories that is to be controlled (e.g., thermostat 112). In some embodiments, an intermediary can function as a proxy or coordinator as described in above-referenced U.S. application Ser. No. 14/725,891. In some embodiments, the controller can control a media access and media access device 118. In some embodiments, the media access device 118 can provide access to multimedia content in addition to providing support as a hub for a home network. In some embodiments the media access device can have a separate proprietary controller 120.

Various communication transports and combinations of transports can be used, and different transports can be used with different devices. For example, some wireless transports such as the Bluetooth® Classic or Bluetooth® Smart communication protocol and standards promulgated by the Bluetooth SIG (referred to herein as "Bluetooth" and "Bluetooth LE") can support direct point-to-point communication between devices within a limited range. Other wireless transports such as a wireless network complying with Wi- Fi® networking standards and protocols promulgated by the Wi-Fi Alliance (referred to herein as a "Wi-Fi network") can define a wireless network with a central access point that can facilitate communications between different devices on the network. Further, while wireless communication transports are shown, wired transports can also be provided for some or all of the accessories. For example, light bulb 108 can be connected to access point 114 by a wired connection, and controller 102 can communicate with light bulb 108 by sending messages wirelessly to access point 114, which can deliver the messages to light bulb 108 via the wired connection. Other combinations of wired and wireless communication are also possible.

Further, while one controller 102 is shown, the network environment can have multiple associated controller devices. In various embodiments, controller 102 is a universal controller able to be programmed to control one or more devices or accessories from various manufacturers. In some embodiments, controller 102 can include a liquid crystal display (LCD) touch-screen displays. Some LCD touch screens include "virtual buttons" on the display of the remote. In some embodiments, the user interface elements (buttons) on the device can be programmed and reprogrammed to perform other functions. In some embodiments, the display of the controller 102 can register physical gestures of a user. In some embodiments, the controller 102 contains one of more accelerometer or gyrometer to detect movement of the controller. Some embodiments of controllers allow for changing the configuration of how the virtual buttons are displayed on the controller 102. In some embodiments, the controller 102 can use radio frequency waves to operate devices in which obstacles block a traditional infrared signal. A controller 102 using radio frequency waves can be used to control electronics in the next room.

Many controller devices claim to use Bluetooth for universal control accessories. However, often what actually occurs is that the controller devices send a Bluetooth signal to a hub. The hub incorporates an infrared blaster that sends out the remote control command signals via infrared from the blaster. These communications are also a one-way communication channel from the controller device or the hub to the device. For traditional universal controllers, the remote knows what function the user is commanding when a user interface element is activated. The controller described in the present disclosure is open ended because the controller does not have the knowledge about the activation. In some embodiments, the technique includes authorizing the controller to control one or more accessories of various types that are wirelessly connected to the computing device.

In some embodiments, the universal controller may be a high-end controller such as one manufactured by Savant Systems LLC, Logitech, Elan Home Systems, Crestron Electronics, Inc., and Control4 Corporation. However, the controllers listed are merely an example, the present disclosure is not limited to any one of these systems. In the present disclosure, the communication between the controller and the device can be bi-directional. Therefore, the accessory or device can send information the controller 102.

In some embodiments, a uniform accessory protocol can facilitate communication by a controller 102 with one or more accessories 104-116. The uniform accessory protocol can provide a simple and extensible framework that models an accessory as a collection of services, with each service being defined as a set of characteristics, each of which has a defined value at any given time. Various characteristics can represent various aspects of the accessory's state. For example, in the case of thermostat 112, characteristics can include power (on or off), current temperature, and target temperature. In some embodiments, message formats may be transport-dependent while conforming to the same accessory model. An accessory can provide an "attribute database" that identifies the services and characteristics that the accessory exposes to controllers. A controller 102 can read the attribute database (or a portion thereof) from an accessory and use the attribute database to determine how to interact with the accessory. Examples of an accessory model based on services and characteristics are described in above-referenced U.S. application Ser. No. 14/614,914.

The uniform accessory protocol can further define message formats for controller 102 to send command-and-control messages (requests) to an accessory (or other accessories) and for an accessory to send response messages to controller 102. The command-and-control messages can allow controller 102 to interrogate the current state of accessory characteristics (e.g., by sending a read request) and in some instances to modify the characteristics (e.g., sending a request to write to the power characteristic can result in turning an accessory off or on). Accordingly, any type of accessory, regardless of function or manufacturer, can be controlled by sending appropriate messages. The message format can be the same across accessories of disparate types. Examples of message formats are described in above-referenced U.S. application Ser. No. 14/614,914.

The uniform accessory protocol can further provide notification mechanisms that allow an accessory (or other accessories) to selectively notify controller 102 in the event of a state change. Multiple mechanisms can be implemented, and controller 102 can register, or subscribe, for the most appropriate notification mechanism for a given purpose. Examples of notification mechanisms are described in above-referenced U.S. application Ser. No. 14/614,914.

In some embodiments, communication with a given accessory can be limited to controllers that have received authorization. For instance, the uniform accessory protocol can specify one or more mechanisms (including mechanisms referred to herein as "pair setup" and "pair add") for establishing a "pairing" (also referred to herein as a "local pairing") between controller 102 and a given accessory (e.g., door lock accessory) under circumstances that provide a high degree of confidence that the user intends for controller 102 to be able to control accessory. Pair setup can include an out-of-band information exchange (e.g., the user can enter a numerical or alphanumeric PIN or passcode provided by accessory into an interface provided by controller 102) to establish a shared secret. This shared secret can be used to support secure exchange of "long-term" public keys between controller 102 and accessory, and each device can store the long-term public key received from the other, so that an established pairing can be persistent. After a local pairing is established, controller 102 is considered authorized, and thereafter, controller 102 and accessory can go in and out of communication as desired without losing the established pairing. When controller 102 attempts to communicate with or control accessory, a "pair verify" process specified by the uniform accessory protocol can first be performed to verify that an established local pairing exists (as would be the case, e.g., where controller 102 previously completed pair setup with accessory). The pair verify process can include each device demonstrating that it is in possession of a long-term private key corresponding to the long-term public key that was exchanged during pair setup and can further include establishing a new shared secret or session key to encrypt all communications during a "pair-verified" session, (also referred to herein as a verified session). During a pair-verified session, a controller that has appropriate privileges can perform a "pair add" process to establish another pairing with the accessory on behalf of another controller. Either device can end a pair-verified session at any time simply by destroying or invalidating its copy of the session key.

In some embodiments, multiple controllers can establish a local pairing with the same accessory (e.g., by performing pair setup or by having a pairing added by a controller that previously performed pair setup), and the accessory can accept and respond to communications from any of its paired controllers while rejecting or ignoring communications from unpaired controllers. Examples of pair setup, pair add and pair verify processes, as well as other examples of security-related operations, are described in above-referenced U.S. application Ser. No. 14/614,914. In some embodiments of the present disclosure, additional "relay pairing" processes can be defined and used to allow controllers to communicate with accessories via a relay service external to the local environment.

It will be appreciated that home environment 100 is illustrative and that variations and modifications are possible. Embodiments of the present disclosure can be implemented in any environment where a user wishes to control one or more accessory devices using a controller device, including but not limited to homes, cars or other vehicles, office buildings, campuses having multiple buildings (e.g., a university or corporate campus), etc. A single controller can establish pairings with any number of accessories and can selectively communicate with different accessories at different times. Similarly, a single accessory can be controlled by multiple controllers with which it has established pairings. Any function of an accessory can be controlled by modeling the function as a service having one or more characteristics and allowing a controller to interact with (e.g., read, modify, receive updates) the service and/or its characteristics. Accordingly, protocols and communication processes used in embodiments of the disclosure can be uniformly applied in any context with one or more controllers and one or more accessories, regardless of accessory function or controller form factor or specific interfaces.

II. Network Configuration

Figure 2:
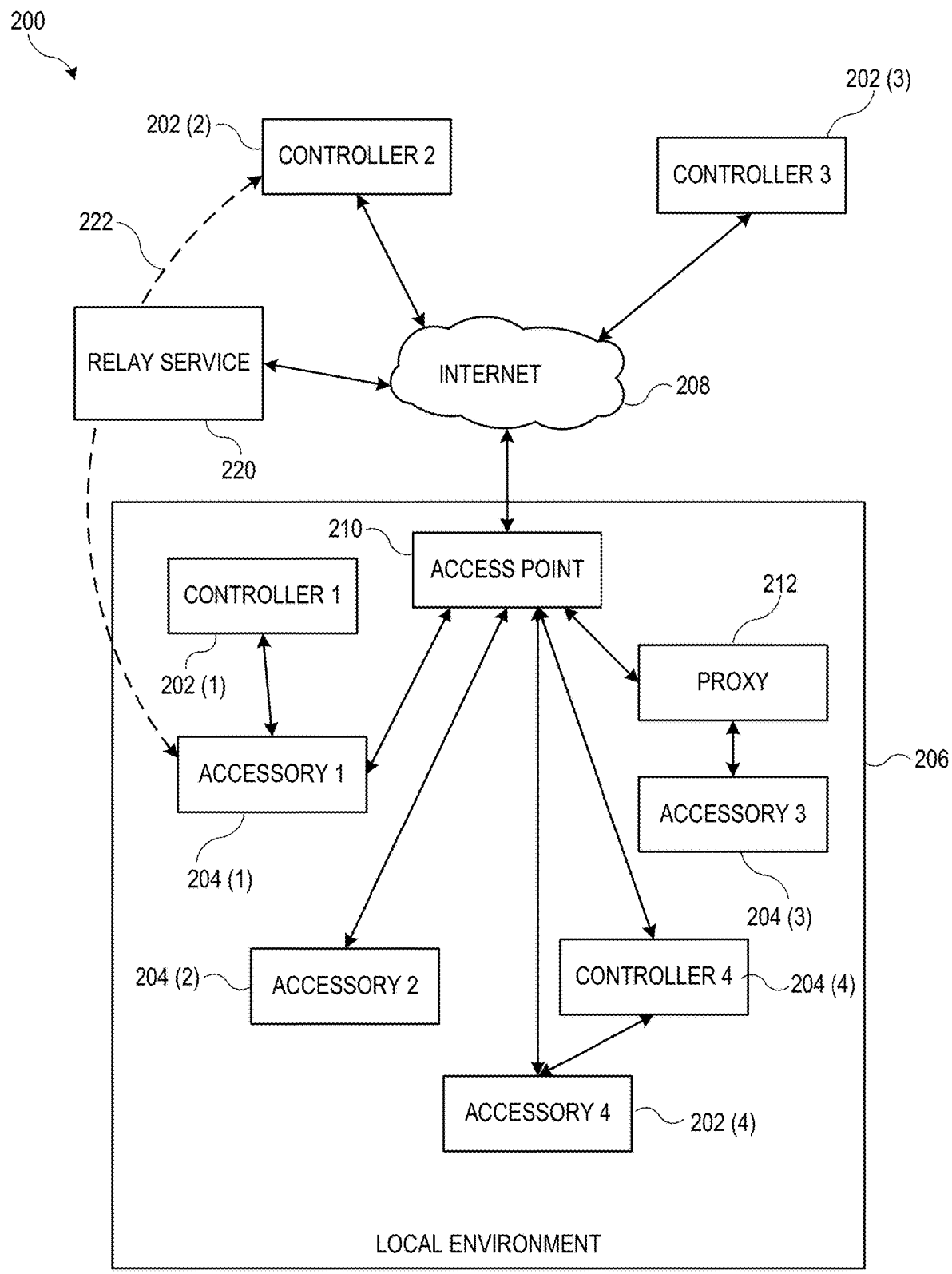
FIG. 2 illustrates a network configuration according to an embodiment of the present disclosure.

FIG. 2 shows a network configuration 200 according to an embodiment of the present disclosure. Configuration 200 allows controllers 202 to communicate with accessories 204 located in local environment 206 (e.g., a home environment such as environment 100 described above). Each controller 202 can be an electronic device owned and/or operated by a user who frequents environment 206 (e.g., a resident of a home or a regular visitor to the home). Controllers 202 can each be similar to controller 102 of FIG. 1, and accessories 204 can be similar to various accessories shown in FIG. 1.

In various embodiments, accessories 204 can each communicate with an access point 210 that can be located in local environment 206. Access point 210 can provide a local area network (LAN) to which accessories 204 and controllers 202 (when present in local environment 206) can connect. Any type of LAN technology can be used, including Wi-Fi networks or other wireless LAN technologies. Thus, access point 210 can facilitate communication between accessories 204 and controllers 202 within local environment 206. In some embodiments, a controller (e.g., controller 202(1)) that is present in local environment 206 can communicate directly with an accessory (e.g., accessory 204(1)). Bluetooth communication, ad hoc wireless networking, or other point-to-point communication technologies can be used as desired.

In some instances, an accessory might not communicate directly with access point 210 or with controllers 202. For example, accessory 204(3) can be connected to a proxy 212, and controllers 202 and/or access point 210 can communicate with accessory 204(3) via proxy 212. In various embodiments, proxy 212 can provide relaying of messages to and from accessory 204(3). Proxy 212 can implement communication security measures and/or protocol translation, and a single proxy 212 can interface to one or more accessories 204. In some embodiments, proxy 212 can be an "intelligent" device that can coordinate operations among multiple controllers and/or accessories and is not limited to passively relaying messages. Specific examples of proxy devices that can be implemented as proxy 212 (including devices referred to variously as bridges, tunnels, and coordinators) are described in above-referenced U.S. application Ser. No. 14/725,891.

In some embodiments, accessories 204 and controllers 202 that are present in local environment 206 can communicate using a local area network (LAN), such as a Wi-Fi network and/or a point-to-point communication medium such as Bluetooth LE. It is to be understood that other communication transports and protocols can be used. In some embodiments, controllers 202 and accessories 204 (and proxy 212 if present) can support a uniform accessory protocol as described above that can be implemented using both Wi-Fi and Bluetooth LE as transports.

In the example of FIG. 2, controller 202(1) is currently located in local environment 206 with accessories 204 and access point 210. For example, controller 202(1) can be on the same LAN as accessories 204. Controllers 202(2) and 202(3) are currently located outside local environment 206 but are connected to a communication network 208 (e.g., the Internet); such controllers are said to be "remote" from accessories 204. It is to be understood that controllers 202 can be mobile devices that are sometimes within local environment 206 and sometimes outside local environment 206. Accessories 204 need not be mobile and need not be connected to communication network 208. In some embodiments, access point 210 can be connected to communication network 208 (e.g., access point 210 can be implemented as a conventional Wi-Fi access point or base station) and can permit remote access to accessories 204 by remote controllers 202(2) and 202(3).

However, it may not be desirable to configure each of accessories 204 as a wide-area network device that can be found and communicated with by any device able to connect to communication network 208. For instance, if communication network 208 is the Internet, a vast number of devices, including devices owned by anyone anywhere in the world, may be able to locate accessories 204 and attempt operations for which they are not authorized. Thus, to more selectively allow controllers 202 to communicate with accessories 204 via network 208, it may be useful to employ a relay service 220.

According to various embodiments of the present disclosure, relay service 220 can facilitate communication between controllers 202 (in particular remote controllers 202(2), 202(3)) and accessories 204 via communication network 208. For example, relay service 220 can establish a persistent connection to accessory 204(1), in which accessory 204(1) is identified by a persistent accessory alias (also referred to as an "accessory relay alias," or "accessory RA") that is assigned by relay service 220 and known to controllers 202 (but presumably not to other devices that are not authorized to access accessories 204). Controller 202(2) can send a request to relay service 220 to deliver a message to accessory 204(1); the request can include the message content, the accessory alias assigned to accessory 204(1) by relay service 220, and additional information (e.g., an access token as described below) usable by relay service 220 to verify that controller 202(2) is authorized to communicate with accessory 204(1). Relay service 220 can deliver the message to accessory 204(1). Response messages from accessory 204(1) can be delivered to controller 202(2) in a similar manner, using a persistent operator alias (also referred to as an "operator relay alias," or "operator RA") that is assigned to controller 202(2) by relay service 220 and known to accessory 204(1) but presumably not to devices that are not authorized to use relay service 220 to communicate with controller 202(2). The message content exchanged between controller 202(2) and accessory 204(1) via relay service 220 can conform to a uniform accessory protocol as described above, and message content can be opaque to relay service 220. Accordingly, controller 202(2) and accessory 204(1) can communicate via relay service 220 to establish a pair-verified session (as defined above) and can encrypt message content such that the message content is not readable by relay service 220 or any other intermediary through which the message content may pass. In this manner, relay service 220 can provide a secure end-to-end communication path (indicated by dashed line 222) between controller 202(2) and accessory 204(1) (or between any controller 202 and any accessory 204).

In some embodiments, controllers 202 can be configured to communicate with accessories 204 without using relay server 220 when possible. For example, when controller 202(2) determines that it should send a message to accessory 204(1) (e.g., based on user input or a received notification as described below), a communication daemon or other process executing in controller 202(2) can determine whether "local access" (or a "local channel") to accessory 204(1) is currently available. For instance, controller 202(2) can actively or passively scan for the presence of accessory 204(1) on a local network or point-to-point communication technology; if accessory 204(1) is detected, then local access is possible. If accessory 204(1) is not detected, then local access is not available and controller 202(2) can communicate with relay service 220 instead. The determination whether to use local access or relay service 220 can be transparent to the user and can be made each time a communication channel to the accessory is to be established. Thus, a user who wants to interact with accessory 204(1) using controller 202(2) can simply do so without worrying about whether to use local access or remote access via relay service 220.

In some embodiments, controller 204 (4) can be a proprietary controller device programmed to control one or more accessory 202 (4). The controller 204(4) can be added to the network with procedures similar for adding other accessories to the network. In some embodiments, the controller 204(4) can operate in the local environment and control accessory 204(1), 204(2), and 204(3) through an access point 210. In some embodiments, the proprietary accessory 202(4) can be controlled by controllers 202(2) and 202(3) from outside the local environment.

It will be appreciated that network configuration 200 is illustrative and that variations and modifications are possible. Any number of controllers and any number of accessories can be included in a network configuration. In some embodiments, the network configuration can include one or more proxies (e.g., bridges, tunnels, coordinators as described in above-referenced U.S. application Ser. No. 14/725,912). Some or all of accessories 204 may be accessible only within the local environment. Further, as described below, different controllers 202 may have different levels of permission in regard to accessing accessories 204; for instance, remote access via network 208 may be permitted for some controllers 202 but not for other controllers 202.

III. Setup

Figure 3:
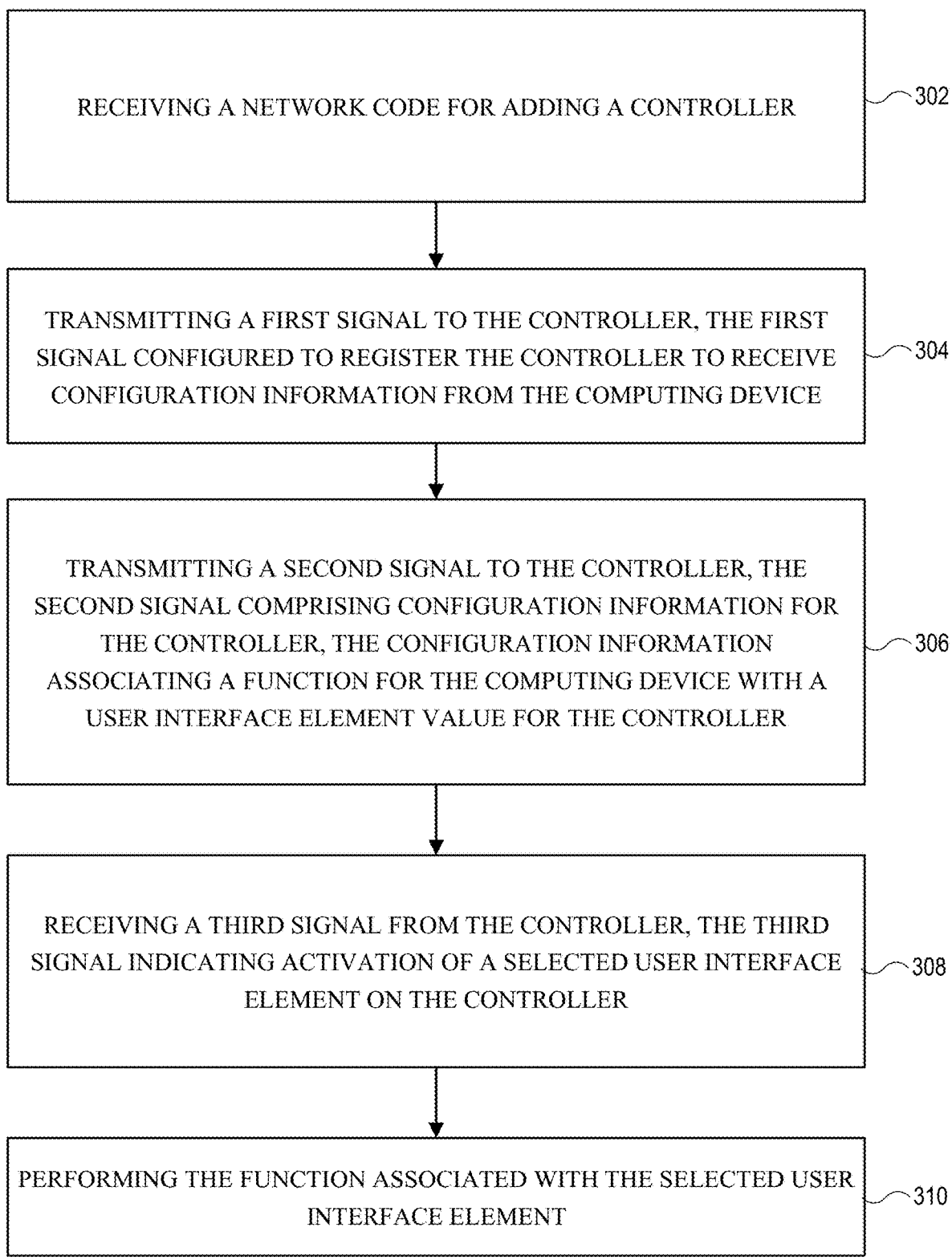
FIG. 3 illustrates a simplified flow diagram for a technique for authorizing universal devices according to an embodiment of the present disclosure.

FIG. 3 illustrates a simplified flow diagram for a technique for authorizing universal devices according to an embodiment of the present disclosure. A controller can be added to the network in a similar manner as other accessories. The technique for adding a controller can include receiving, at 302, by a computing device for a network, a network code for adding a controller. In some embodiments the network code identified via a user interface of an application for the network. In some embodiments, the network can be a home network. Alternatively, the computing device can be referred to a hub computing device, or a host computing device. In some embodiments, the computing device can be the media access device 118, shown in FIG. 1.

In some embodiments, adding a controller to a network involves pairing the devices. Pairing establishes a cryptographic relationship between the media access device 118, shown in FIG. 1, and the controller 102. There can be two components to pairing: pair setup and pair verify. Pair setup is a one-time operation that creates a valid pairing between the media access device 118 and an accessory or a controller 102 by securely exchanging public keys with the media access device 118 and the accessory or the controller 102. Pair setup requires a user to enter a network code. The network code can be a numeric or alpha-numeric code of varying length (e.g., an eight-digit network code.) In various embodiments, the network code can be provided by the accessory or the controller 102 via a label or display on the device, packing materials, or instructions for the device.

In some embodiments, a machine-readable code such as a barcode or a Quick Response (QR) code can contain the network code. In some embodiments, the machine-readable code can be printed on the label for the accessory or the controller. In these embodiments, entering the network code can be established by scanning the machine-readable code with a device capable of reading the machine-readable code. In some embodiments, controllers can be smartphones or tablets with digital imaging devices (e.g., a camera) that are capable of reading the machine-readable code.

In some embodiments, the media access device 118, shown in FIG. 1, can be controlled through an application on a smartphone, a tablet, a laptop, or other computing device. Various applications (Apps for short) can be developed to control the interaction between the media access device 118, accessories, and controllers. The application can provide a user interface which allows a user to manually enter the network code. In some embodiments, the network code can be entered through a keyboard or keypad. In some embodiments, the network code can be entered via a virtual keyboard. In some embodiments, the application can enable a user to scan the machine-readable code with a camera on the device executing the application. Scanning the machine-readable code can capture the network code in the application.

The pair verify process can be performed prior to any networking protocol session. Pair verify verifies the pairing between a computing device, and a controller or an accessory. Pair verify establishes an ephemeral shared secret to secure the networking protocol session.

The technique for adding a controller can include, transmitting, at 304, by the computing device, a first signal to the controller, the first signal configured to register the controller to receive configuration information from the computing device. The first signal can be a wired or wireless signal. The controller can receive the first signal and establish a link between the computing device and the controller 102.

At 306, the technique includes transmitting, by the computing device, a second signal to the controller, the second signal including the configuration information for the controller, the configuration information associating a function for the computing device with a user interface element value for the controller. The second signal can be a wired or wireless signal. Unlike traditional universal controllers which rely on selecting a variety of infrared (IR) codes for a specific device, the techniques disclosed herein involve transmitting a configuration from the computing device to the controller 102. In this way, the configuration can change as the features on the media access device 118 changes.

After one or more controllers and media access device are added to the network, a network daemon and framework provide interface to manage the association of media access and networking device 118 with the controllers. Different network clients such as a home networking application or television settings application these interfaces to provide a user interface (UI) for user to manage these associations. When an media access networking device 118 is associated with a controller 102, the network daemon making this association will configure the controller 102 with the configuration for the user interface elements so that the controller 102 can generate events to any interested controllers. The user interface elements can also be referred to as buttons. The network daemon on the media access device 118 that has been associated with the controller 102 can register for notifications on the Active Identifier networking protocol characteristic in the accessory control network protocol service. This characteristic identifies the accessory selected by the user from the UI of the controller 102.

The user interface can be device specific. In some embodiments, the controller 102 may have programmable buttons for user interface elements. In some embodiments, the controller may have soft keys for user interface elements. The functions for the computing device can vary based on the software release for the computing device. In some embodiments, the functions include allowing a user to access web video applications. The functions can also include the standard functions associated with a digital media player including playing movies and shows, playing music, games, streaming live sports and news, presenting digital content from Apps like Amazon Prime Video, Hulu, ESPN, and Netflix. The functions can also include accessing a virtual assistant. The functions can also include casting audio and video from other computing devices and allowing a user to browse the internet.

In some embodiments, the functions of the computing device can be associated with one or more accessories on a network. For example, the function may include turning on an alarm, locking a door, turning off a lightbulb or adjusting the thermostat.

This same action can be performed by the network daemon on each media access device 118 that has been associated with the controller 102. When the user selects one of the associated accessories in the user interface of the controller 102, the controller 102 modifies the Active Identifier networking protocol characteristic to match the identifier of the media access networking device 118 configured as part of the association. The network daemon on each of the associated media devices 118 notice the change and only the media access device 118 that matches the value in the Active Identifier networking protocol characteristic will register to receive notifications from the user interface elements (buttons) from the controller 102.

At 308, the technique can include receiving, by the computing device, a third signal from the controller, the third signal indicating interaction with a selected user interface element on the controller. The third wireless signal can be a wired or wireless signal. The interaction with the selected user interface element can include the activation of the user interface element by physical contact with the user interface element. In some embodiments, the interaction with the selected user interface element can include detecting a gesture of a user on the touch screen display of the controller 102. In some embodiments, the interaction with the selected user interface element can include detecting the acceleration or movement of the controller 102. The activation of the user interface element can be a tactile input of a user on a touchscreen display or depressing a button on the controller 102.

When the user interacts with any of the user interface elements or buttons in the user interface of the controller 102, the controller 102 generates a notification on the user interface element event network protocol characteristic. The network daemon on the media access device 118 matching the Active Identifier networking protocol characteristic receives this user interface element event and translates it to the media access networking device 118 for performing a specific action, In some embodiments, the specific action can include a function for the media access device 118 such as Play, Pause, Rewind, Forward, 2× rewind, 2× forward, Menu, etc.

At 310, the technique can include performing, by the computing device, the function associated with the selected user interface element. Upon receipt of the third signal, the computing device can perform the function associated with the user interface element on the controller 102.

It will be appreciated that process 300 is illustrative and that variations and modifications are possible. Steps described as sequential may be executed in parallel, order of steps may be varied, and steps may be modified, combined, added or omitted.

When the user selects a different media access and home networking device in the user interface of the controller 102, the controller 102 modifies the Active Identifier networking protocol characteristic to match the Identifier of the media access networking device 118 configured as part of the association. The network daemon on the previously selected media access device 118 shuts off the notifications on the user interface element event network protocol characteristic of the controller 102 networking protocol service and network daemon on the newly selected media device 118 will start listening for the new user interface element value networking protocol characteristic.

Another advantage of the present disclosure is the ability of the network to reconfigure the controller 102 to account for configuration changes. In some embodiments, the technique includes identifying, by the computing device, a change in the configuration information for the computing device. The technique can also include transmitting, by the computing device, a fourth signal that includes revised configuration information for associating functions of the computing device with the user interface element value for the controller. The fourth signal may be a wired or wireless signal. For example, if the media access device 118 initially only enables nine user interface elements (buttons). If a software update for the media access device 118 results in enabling 23 user access elements, the technique will identify this configuration change and transmit the configuration information the controller 102. The configuration can change so the appropriate controller 102 would also change without the user having to reconfigure the controller 102 through the controller interface. The protocol can be changed not just to control one media access device 118, but can be used to control other media devices.

Another feature of the present disclosure is to enable the controller to control accessories in the network (e.g., a home network). The network can be configured to control one or more accessories (e.g., lights, alarm, garage doors, blinds, thermostats). Once configured with the network protocol, the controllers 102 can be used to control various accessories previously only controlled by a proprietary or network enabled controller.

The network protocol has a way of remapping the user interface element types on the controller 102. The protocol can also provide names to the user interface elements. For example, if the controller 102 can support more user interface elements than required by the media access device 118. In the present technique, the controller 102 does not know what function user interface element commands. Remote control manufactures only support a limited number of languages to display names of user interface elements. Some networks support many more languages, and having the protocol supply the names of the user interface elements will allow a controller 102 to be more robust by displaying user interface elements in many more native languages.

In various embodiments, the information packets from the controller to the media access device are over internet protocol (IP).

In some embodiments, the technique includes authorizing the controller 102 to control one or more accessories of various types that are connected to the computing device. The accessories can be connected to the computing device via a wired or wireless connection.

In some embodiments, the technique includes synchronizing the control of the one or more accessories such that a command from the controller 102 will perform a related function for each of a same type of accessory.

In some embodiments, the technique includes causing an interface of the controller 102 to display representations of the one or more accessories on a display of the controller 102.

In some embodiments, the technique can include receiving, from the controller 102, authorization for the computing device to control one or more accessories of various types that are connected to the controller. The technique can include synchronizing the control of the one or more accessories such that a command from the computing device will perform a related function for each of a same type of accessory. The technique can include providing an interface for a user to select the one or more accessories on the computing device.

Figure 4:
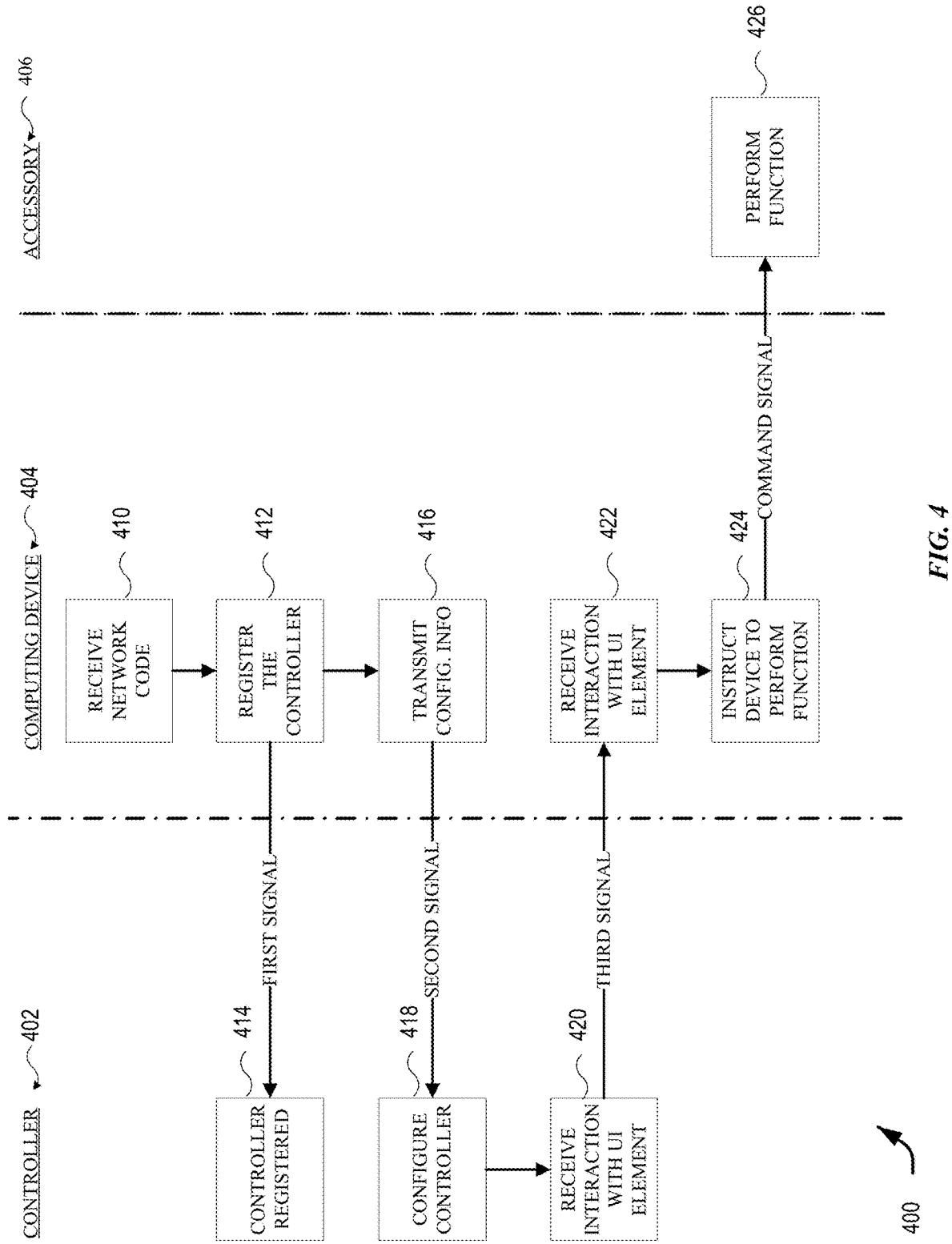
FIG. 4 illustrates a diagram for a technique for authorizing universal devices according to an embodiment of the present disclosure.

FIG. 4 illustrates a diagram for a network 400 for a technique for authorizing universal devices according to an embodiment of the present disclosure. FIG. 4. illustrates three devices used for the disclosed technique. The devices include a controller 402, a computing device 406, and an accessory. In some embodiments the network 400 can be a home network.

The controller 402 can be a universal controller can be a proprietary controller device programmed to control one or more devices or accessories. In some embodiments, the controller 402 can be configured to send and receive wireless signals. In some embodiments, the controller 402 can be configured to send or receive wired signals. The controller 402 can have a processor to execute programmed instructions saved in a memory of the controller 402. The controller can have a display. The display can be a touch screen display. The touch screen display can be programmed to present user interface elements (buttons) or soft-keys. In some embodiments, the user interface elements are capable of being programmed or reprogrammed with instructions. The instructions can be saved in a memory of the device.

The computing device 404 can include a media access device 118. The computing device 404 can programmed to control one or more devices or accessories. In some embodiments, the computing device 404 can be configured to send and receive wireless signals. In some embodiments, the computing device 404 can be configured to send or receive wired signals. The computing device 404 can have a processor to execute programmed instructions saved in a memory of the computing device 404. The computing device can have a display. The display can be a touch screen display. The touch screen display can be programmed to present user interface elements (buttons) or soft-keys. In some embodiments, the user interface elements are capable of being programmed or reprogrammed with instructions. The instructions can be saved in a memory of the computing device. The computing device can include a media player or Bluetooth speaker.

The accessory 406 can one or more devices including a door lock, garage door system, window blinds, light fixture, security camera, and thermostat. The accessory 406 can be controlled by the controller 402 or can be controlled by a computing device 404 or through a network interface device.

At 410, the technique for authorizing universal devices according to an embodiment of the present disclosure can include receiving a network code by the computing device. In some embodiments, the network code can be identified via a user interface of an application for the network. In some embodiments, the network can be a home network. In some embodiments, the computing device can be the media access device 118, shown in FIG. 1.

The network code can be a numeric or alpha-numeric code of varying length (e.g., an eight-digit network code.) In various embodiments, the network code can be provided by the accessory or the controller 102 via a label or display on the device, packing materials, or instructions for the device. In some embodiments, a machine-readable code such as a barcode or a Quick Response (QR) code can contain the network code. In some embodiments, the machine-readable code can be printed on the label for the accessory or the controller. In these embodiments, entering the network code can be established by scanning the machine-readable code with a device capable of reading the machine-readable code. In some embodiments, controllers can be smartphones or tablets with digital imaging devices (e.g., a camera) that are capable of reading the machine-readable code.

In some embodiments, the computing device 404, can be controlled through an application on a smartphone, a tablet, a laptop, or other computing device. Various applications (Apps for short) can be developed to control the interaction between computing device 404, accessories, and controllers. The application can provide a user interface which allows a user to manually enter the network code. In some embodiments, the network code can be entered through a keyboard or keypad. In some embodiments, the network code can be entered via a virtual keyboard. In some embodiments, the application can enable a user to scan the machine-readable code with a camera on the device executing the application. Scanning the machine-readable code can capture the network code in the application.

The pair verify process can be performed prior to any networking protocol session. Pair verify verifies the pairing between a computing device, and a controller or an accessory. Pair verify establishes an ephemeral shared secret to secure the networking protocol session.

At 412, the technique for adding a controller can include, transmitting by the computing device 404, a first signal to the controller, the first signal configured to register the controller 402 to receive configuration information from the computing device 404. The first signal can be a wired or wireless signal. The controller 402 can receive the first signal and establish a link between the computing device 404 and the controller 402.

At 414, the controller 402 is registered with the network and configured to receive the configuration information from the computing device 404.

At 416, the technique includes transmitting, by the computing device, a second signal to the controller, the second signal including the configuration information for the controller, the configuration information associating a function for the computing device with a user interface element value for the controller. The second signal can be a wired or wireless signal. Unlike traditional universal controllers which rely on selecting a variety of infrared (IR) codes for a specific device, the techniques disclosed herein involve transmitting a configuration from the computing device to the controller 402. In this way, the configuration can change as the features on the computing device 402 changes.

After one or more controllers and media access device are added to the network, a network daemon and framework provide interface to manage the association of media access and networking device 118 with the controllers. Different network clients such as a home networking application or television settings application these interfaces to provide a user interface (UI) for user to manage these associations. When a computing device 404 is associated with a controller 402, the network daemon making this association will configure the controller 402 with the configuration for the user interface elements so that the controller 402 can generate events to any interested controllers. The user interface elements can also be referred to as buttons. The network daemon on the computing device 404 that has been associated with the controller 402 can register for notifications with the networking protocol characteristic in an accessory control network protocol service. This networking protocol characteristic identifies the accessory selected by the user from the user interface of the controller 402.

At 418, the controller 402 can be configured with the configuration information for the computing device 404. In some embodiments, the controller 402 can load the configuration information from the second signal into a memory of the controller 402. In some embodiments, the configuration can include a series of computer readable instructions that cause the processor in the controller. The configuration information can associate a function on the computing device 402 or accessory 406 to be performed upon interaction with the user interface element.

The user interface can be device specific. In some embodiments, the controller 402 may have programmable buttons for user interface elements. In some embodiments, the controller 402 may have soft keys for user interface elements. The functions for the computing device 404 can vary based on the software release for the computing device 404. In some embodiments, the functions include allowing a user to access web video applications. The functions can also include the standard functions associated with a digital media player including playing movies and shows, playing music, games, streaming live sports and news, presenting digital content from Apps like Amazon Prime Video, Hulu, ESPN, and Netflix. The functions can also include accessing a virtual assistant. The functions can also include casting audio and video from other computing devices and allowing a user to browse the internet.

In some embodiments, the functions of the computing device 404 can be associated with one or more accessories on a network. For example, the function may include turning on an alarm, locking a door, turning off a lightbulb or adjusting the thermostat.

This same action can be performed by the network daemon on each computing device 404 that has been associated with the controller 402. When the user selects one of the associated accessories in the user interface of the controller 402, the controller 402 modifies the networking protocol characteristic to match the identifier of the computing device 404 configured as part of the association. The network daemon on each of the associated computing device 404 notice the change and only the computing device 404 that matches the value in the networking protocol characteristic will register to receive notifications from the user interface elements (buttons) from the controller 402.

At 420, the controller 402 can receive an interaction with a selected user interface element on the controller 402. The interaction with the selected user interface element can include the activation of the user interface element by physical contact with the user interface element. In some embodiments, the interaction with the selected user interface element can include detecting a gesture of a user on the touch screen display of the controller 402. In some embodiments, the interaction with the selected user interface element can include detecting the acceleration or movement of the controller 402. The activation of the user interface element can be a tactile input of a user on a touchscreen display or depressing a button on the controller 402. The interaction with the user interface element can generate a third signal to be transmitted to the computing device 404. The third signal can be wired or wireless. The third signal can include information sufficient to indicate the function desired by the computing device 404 or the accessory 406.

At 422, the technique can include receiving, by the computing device 404, the third signal from the controller, the third signal indicating interaction with a selected user interface element on the controller. The computing device 404 can process the third signal and execute selected functions designed to be performed by the computing device 404. The computing device 404 can also receive the third signal and generate a command signal to an accessory. The command signal can be wired or wireless.

When the user interacts with any of the user interface elements or buttons in the user interface of the controller 402, the controller 402 generates a notification on the user interface element event network protocol characteristic. The network daemon on the computing device 404 matching the networking protocol characteristic receives this user interface element event and translates it to the computing device 404 for performing a specific action, In some embodiments, the specific action can include a function for the computing device 404 such as Play, Pause, Rewind, Forward, 2×
rewind, 2× forward, Menu, etc.

At 424, the technique can include performing, by the computing device 404, the function associated with the selected user interface element. Upon receipt of the third signal, the computing device can perform the function associated with the user interface element on the controller 402. In some embodiments, the upon receiving the third signal, the computer interface can instruct an accessory 406 or device to perform a specific function.

At 426, the accessory 406 can receive the command signal and perform the function provided by the command signal. In some embodiments, the function can be activating the device. In some embodiments, the function can be de-activating the device.

It will be appreciated that process 400 is illustrative and that variations and modifications are possible. Steps described as sequential may be executed in parallel, order of steps may be varied, and steps may be modified, combined, added or omitted.

IV. Virtual Assistant

In various embodiments, a virtual assistant can be used to interact with a media access device 118 such as a television set-top box controlling content shown on a television display. A mobile user device 118 or a controller 102 with a microphone can be used to receive speech input for the virtual assistant. The user's intent can be determined from the speech input, and the virtual assistant can execute tasks according to the user's intent, including causing playback of media on a connected television and controlling any other functions of a television set-top box or like device (e.g., managing video recordings, searching for media content, navigating menus, etc.).

Virtual assistant interactions can be shown on a connected television or other display. In one example, media content can be determined based on speech input received from a user. A first user interface with a first small size can be displayed, including selectable links to the determined media content. In some embodiments, after receiving a selection of a media link, a second user interface with a second larger size can be displayed, including the media content associated with the selection. In other examples, the interface used to convey virtual assistant interactions can expand or contract to occupy a minimal amount of space while conveying desired information.

In some examples, multiple devices associated with multiple displays can be used to determine user intent from speech input as well as to convey information to users in different ways. For example, speech input can be received from a user at a first device having a first display. The user's intent can be determined from the speech input based on content displayed on the first display. Media content can be determined based on the user intent, and the media content can be played on a second device associated with a second display.

Media display content can also be used as contextual input for determining user intent from speech input. For example, speech input can be received from a user, including a query associated with content shown on a television display. The user intent of the query can be determined based on the content shown on the television display as well as a viewing history of media content on the television display (e.g., disambiguating the query based on characters in a playing multimedia show). The results of the query can then be displayed based on the determined user intent.

In some examples, virtual assistant query suggestions can be provided to the user (e.g., to acquaint the user with available commands, suggest interesting content, etc.). For example, media content can be shown on a display, and an input can be received from the user requesting virtual assistant query suggestions. Virtual assistant queries suggestions can be determined based on the media content shown on the display and a viewing history of media content shown on the display (e.g., suggesting queries related to a playing multimedia show). The suggested virtual assistant queries can then be shown on the display.

Controlling television user interactions using a virtual assistant according to the various examples discussed herein can provide an efficient and enjoyable user experience. User interactions with media control devices can be intuitive and simple using a virtual assistant capable of receiving natural language queries or commands. Available functions can be suggested to users as desired, including meaningful query suggestions based on playing content, which can aid users to learn control capabilities. In addition, available media can be made easily accessible using intuitive spoken commands. It should be understood, however, that still many other advantages can be achieved according to the various examples discussed herein.

The term "television" can thus refer to any type of display associated with any of a variety of devices. Moreover, the terms "virtual assistant," "digital assistant," "intelligent automated assistant," or "automatic digital assistant" can refer to any information processing system that can interpret natural language input in spoken and/or textual form to infer user intent, and perform actions based on the inferred user intent. For example, to act on an inferred user intent, the system can perform one or more of the following: identifying a task flow with steps and parameters designed to accomplish the inferred user intent; inputting specific requirements from the inferred user intent into the task flow; executing the task flow by invoking programs, methods, services, APIs, or the like; and generating output responses to the user in an audible (e.g., spoken) and/or visual form.

A virtual assistant can be capable of accepting a user request at least partially in the form of a natural language command, request, statement, narrative, and/or inquiry. Typically, the user request seeks either an informational answer or performance of a task by the virtual assistant (e.g., causing display of particular media). A satisfactory response to the user request can include provision of the requested informational answer, performance of the requested task, or a combination of the two. In response, the virtual assistant can acknowledge the request and then create an appropriate reminder item in the user's electronic schedule. During the performance of a requested task, the virtual assistant can sometimes interact with the user in a continuous dialogue involving multiple exchanges of information over an extended period of time. There are numerous other ways of interacting with a virtual assistant to request information or performance of various tasks. In addition to providing verbal responses and taking programmed actions, the virtual assistant can also provide responses in other visual or audio forms (e.g., as text, alerts, music, videos, animations, etc.). Moreover, as discussed herein, an exemplary virtual assistant can control playback of media content (e.g., playing video on a television) and cause information to be displayed on a display.

An example of a virtual assistant is described in Applicants' U.S. Utility application Ser. No. 12/987,982 for "Intelligent Automated Assistant," filed Jan. 10, 2011, the entire disclosure of which is incorporated herein by reference and for all purposes.

Further description on the functionality of virtual assistants for TV user interactions is described in U.S. Utility application Ser. No. 15/085,465 for "Intelligent Automated Assistant for TV User Interactions," filed Mar. 30, 2016, now U.S. Pat. No. 9,668,024, the entire disclosure of which is incorporated herein by reference and for all purposes.

The present disclosure relates to the access to a virtual assistant by universal controllers. The controller 102 can include a microphone for capturing audio input (e.g., speech input from a user), a button(s) for capturing tactile input, and transceiver for facilitating communication with the media access device 118 via a controller 102. The controller 102 can also include other input mechanisms, such as a keyboard, joystick, touchpad, or the like. The controller 102 can further include output mechanisms, such as lights, a display, a speaker, or the like. Input received at the controller 102 (e.g., user speech, button presses, etc.) can be communicated to the media access and home networking device via controller. I/O subsystem can also include other input controller(s).

In order to transport the audio information from a universal controller to a media access device 118 a proper channel a channel can be configured. The framework for the protocol for opening a channel is described commonly-owned U.S. patent application Ser. No. 62/575,373, filed Oct. 21, 2017, entitled "Personal Domain for a Virtual Assistant System on a Communal Device," the entire disclosure of which is incorporated herein by reference and for all purposes.

Figure 5:
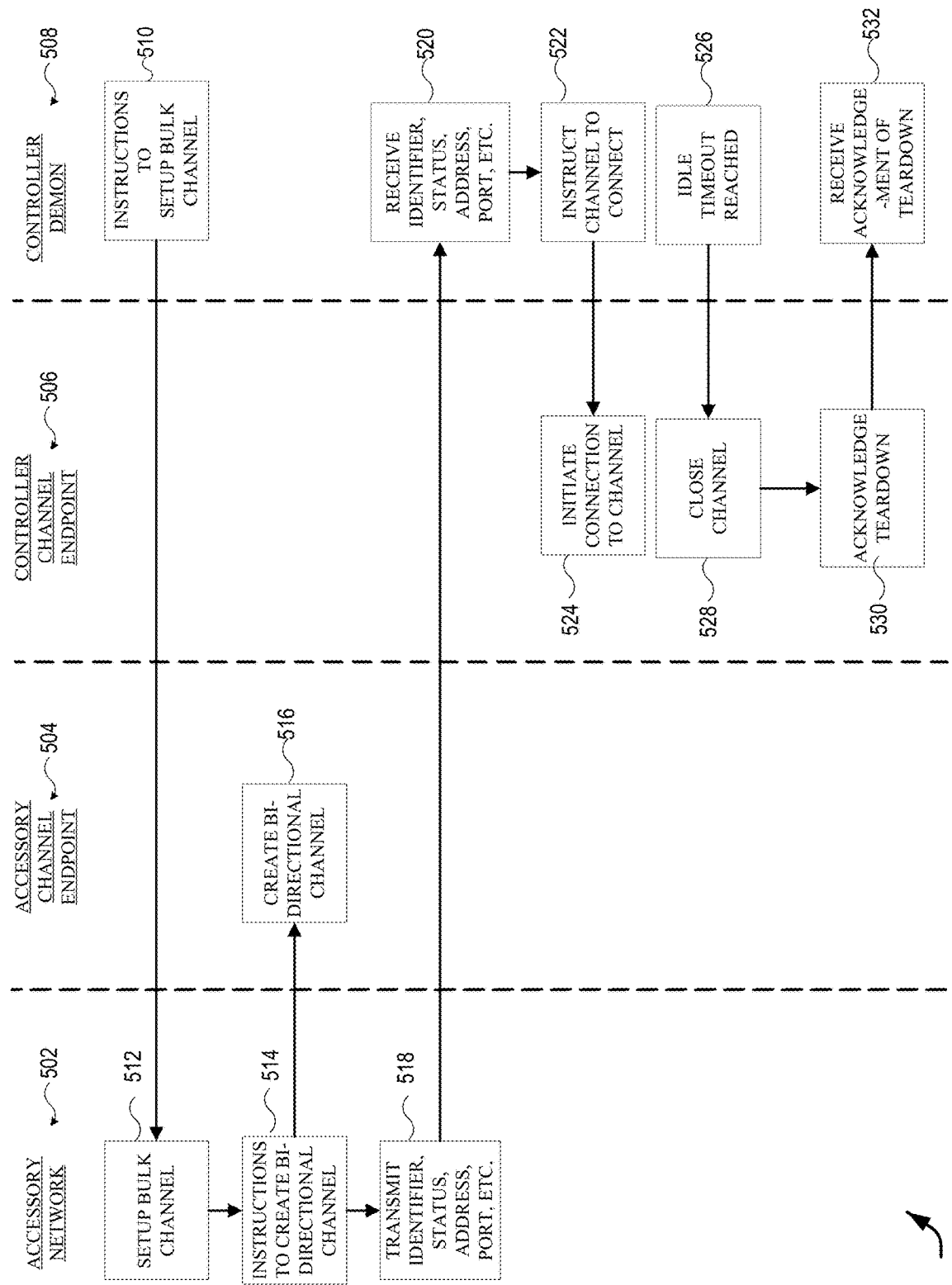
FIG. 5 illustrates a simplified flow diagram for a technique for opening a channel according to another embodiment of the present disclosure.

FIG. 5 illustrates a simplified flow diagram for a technique for opening a channel according to an embodiment of the present disclosure. In order to establish a channel for the transfer of audio data a socket can be first be created. In the technique for opening a channel as described in FIG. 5, several components are described. An accessory network 502 can include a wireless network in which one or more controllers can be used to control one or more accessories. The accessory network 502 can include a home network. The accessory network normally employs a protocol for control of accessories. Some protocols support both IP and Bluetooth LE. The protocol can be protocol mapped over HTTP/S with discovery leveraging Bonjour. The protocol messages between the OS and the network compliant devices use JavaScript Object Notation (JSON) (and hence JSON parsing would be required). JavaScript Object Notation or JSON is an open-standard file format that uses human-readable text to transmit data objects consisting of attribute-value pairs and array data types.

A socket is one endpoint of a two-way communication link between two programs running on the network. A socket is bound to a port number so that the TCP layer can identify the application that data is destined to be sent to. An accessory socket is an accessory channel endpoint 504 associated with an accessory that is connected to the network. A controller socket is an controller channel endpoint 506 associated with a controller that is connected to the network.

In multitasking computer operating systems, a demon is a computer program that runs as a background process, rather than being under the direct control of an interactive user. A demon is a program or process, part of a larger program or process, that is dormant until a certain condition occurs and then is initiated to do its processing. A controller demon 508 is a computer program associated with a controller that is dormant under certain conditions occurs and then runs as a background process.

At 510, the controller 508 provides instructions to set-up a bulk channel. These instructions can be wirelessly communicated to the computing device. In some embodiments, the instructions to set-up the bulk channel can be communicated through a wired connection.

At 512, the home network receives the instructions from the controller demon to set-up the bulk channel. The computing device receives the instructions and takes the steps necessary to set-up and configure the bulk channel.

At 514, the computing device provides instructions to create a channel. One type of a bi-directional channel can be a listener or server socket. Listener or server sockets open a port on the network and then wait for a client to connect to that port. Although other network address families and protocols exist, one example is for creating remote service for a TCP/IP network. The unique address of a TCP/IP service can be defined by combining the IP address of the host with the port number of the service to create an endpoint for the service. The DNS class provides methods that return information about the network addresses supported by the local network device. When the local network device has more than one network address, or if the local system supports more than one network device, the DNS class returns information about all network addresses, and the application can choose the proper address for the service.

At 518, the computing device transmits configuration information to the controller. The configuration information can include the identifier, status, address, and port information. Sockets are assumed to be associated with a specific socket address, namely the IP address and a port number for the local node, and there is a corresponding socket address at the foreign node (other node), which itself has an associated socket, used by the foreign process. Associating a socket with a socket address is called binding. In computer networking, a port is an application-specific or process-specific software construct serving as a communications endpoint used by Transport Layer protocols of the Internet Protocol Suite, such as TCP and UDP. Ports can be identified by their port number (between 0 and 65535).

At 520, the controller demon receives the configuration information. The configuration information can be saved on the computing device.

At 522, the controller demon instructs the controller to connect to the controller channel endpoint 506. The controller demon uses the configuration information to connect to the channel.

Figure 6:
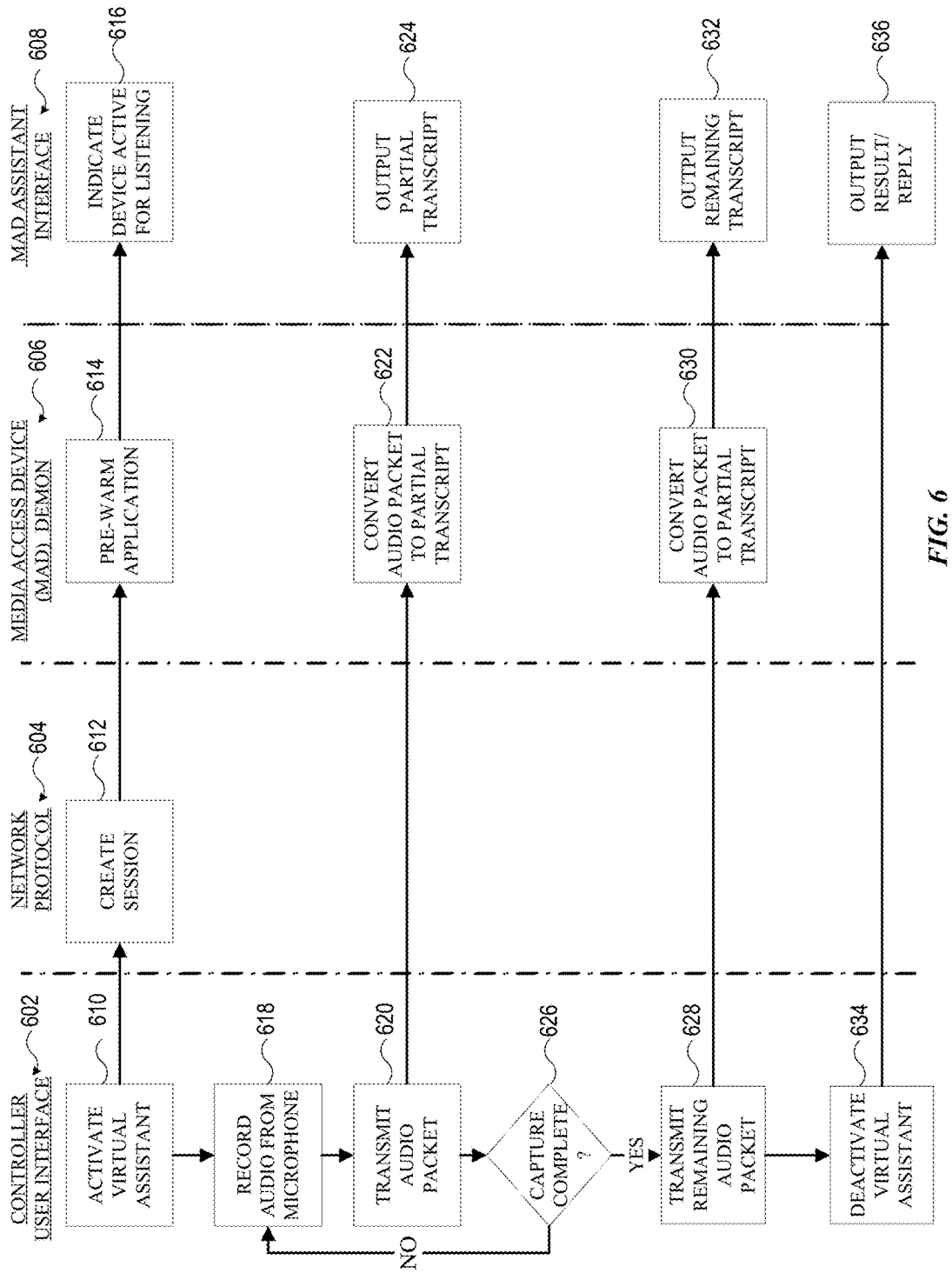
FIG. 6 illustrates a simplified flow diagram for a technique for enabling a controller device access a virtual assistant according to an embodiment of the present disclosure.

At 524, the controller socket using the configuration information provided in step 520, initiates connection to the controller channel endpoint 506. Once the channel endpoint is connected a communications channel is formed allowing for transfer of data between the home network and the controller. After the channel is formed, the procedures for transfer of audio information of a virtual assistant can be performed in process 500 as shown in FIG. 6.

At 526, after a pre-determined time period the idle timeout is reached. After this time period, the controller demon will send instructions to the controller channel endpoint to close the channel. The idle time can be varied as necessary.

At 528, the controller channel endpoint closes the channel.

At 530, the controller channel endpoint acknowledges the teardown of the channel and transmits the teardown message to the controller demon.

At 532, the controller demon receives the acknowledgement of the teardown thereby ending the process.

It will be appreciated that process 500 is illustrative and that variations and modifications are possible. Steps described as sequential may be executed in parallel, order of steps may be varied, and steps may be modified, combined, added or omitted.

FIG. 6 illustrates a simplified flow diagram for a technique virtual assistant control 600 from a universal controller according to an embodiment of the present disclosure. The technique for enabling a universal controller activate a virtual assistant for a network can include several components including a controller user interface 602, network protocol 604, a media access device (MAD) demon 606, and a MAD assistant interface 608. The controller user interface 602 can include a plurality of user interface elements (buttons) that allow a user to activate the virtual assistant. The network protocol 604 can enable the controller to communicate with accessories. In some embodiments, the network protocol is for a home network. However, the network protocol 604 describe in FIG. 6 is not limited to the HAP. The media access device demon 606 can communicate commands to the controller. The media access device assistant interface 608 allows the virtual assistant to communicate with the media access device and the network.

At 610, the process starts when a user activates a virtual assistant on the controller user interface. Activation of the virtual assistant can include touching a user interface element associated with the virtual assistant or depressing a physical button on the controller that is associated with the virtual assistant.

At 612, the home network protocol creates a virtual assistant session. If the accessory and controller sockets are not created, as described in FIG. 5, the channel creation technique is activated.

At 614, the media access device demon executes a pre-warm application. During the pre-warm application, one or more applications can be pre-loaded or activated in anticipation of receipt of information via a channel. In some embodiments, the information is audio information. The pre-load process can reduce any latency with transcribing or executing the instructions captured in the audio information.

At 616, the media access device indicates that the virtual assistant is active for listening. For example, a media access device can present some visual indication on a display that the virtual assistant is capturing the audio information. In some embodiments, the visual indication may be a appear as animation that will change as audio is captured. In some embodiments, the media access device will emit an auditory tone such as one or more tones or beeps. In some embodiments, the media access device will illuminate one or more light emitting diodes (LEDs) indicating the media access device is capturing the information.

At 618, the controller records audio from a microphone on the controller. In some embodiments, the audio can be saved on the controller as a packet of digital information. The controller can capture the audio information from the microphone starting from the moment when the virtual assistant is activated. The audio stream can be broken up into audio packets. In some embodiments, the size of the audio packets can be varied. In some embodiments, the audio packets capture 20 milliseconds of audio information. In some embodiments, the audio packets can be 2.5 milliseconds of audio information. In some embodiments, the controller can capture digital information other than audio information to send to the media access device.

At 620, the controller transmits the audio packet to the media access device via a signal. In some embodiments, the signal can be a wired or wireless signal. The audio information can be sent from a controller channel endpoint through a b-directional channel to the media access device channel endpoint. The media access device demon receives the audio packet.

At 622, the media access device demon converts the audio packet to a partial transcript. The partial transcript can be a single or a plurality of letters. The partial transcript can be a few words to a phrase. The media access device demon sends the audio packet to the virtual assistant interface. In some embodiments, the virtual assistant processing can be performed using a cloud storage device. The virtual assistant processing can understand the audio information and convert it to text. The text will be sent back the media access device assistant interface. The media access device can communicate with the display interface for displaying the text. The controller can transmit the audio information as fast as the packets are generated. In some embodiments, the packets can be sent every 20 milliseconds of audio information. In some embodiments, the audio packets can be sent every 2.5 milliseconds.

At 624, the media access device assistant interface outputs a partial transcript. In some embodiments, the partial transcript can be displayed in a portion of the display connected to the media access device.

At 626, the controller user interface determines if the audio capture is completed. If the audio capture is not completed the process continues to record audio from a microphone.

At 628, if the audio capture is completed, the controller transmits the remaining audio packet(s) to the media access device demon.

At 630, the media access device demon converts the remaining audio packet(s) to a partial transcript. The media access device demon sends the audio packet to the virtual assistant interface. In some embodiments, the virtual assistant processing can be performed using a cloud storage device. The virtual assistant processing can understand the audio information and convert it to text. The text will be sent back the media access device assistant interface. The media access device can communicate with the display interface for displaying the text. The controller can transmit the audio information as fast as the packets are generated. In some embodiments, the packets can be sent every 20 milliseconds of audio information. In some embodiments, the audio packets can be sent every 2.5 milliseconds.

At 632, the media access device assistant interface outputs the remaining transcript. In some embodiments, the partial transcript can be displayed in a portion of the display connected to the media access device.

At 634, the controller user interface deactivates the virtual assistant. In some embodiments, the deactivation can occur by releasing a button. In some embodiments, the deactivation can occur by selecting a user interface element on the controller. In some embodiments, the controller can detect the end of audio information and automatically deactivate the virtual assistant.

At 636, the controller outputs the result or reply to the request. In some embodiments, the results can be displayed in a portion of the display connected to the media access device. In some embodiments, the results may be displayed in list or tabular form on the display. In some embodiments, the results can be to execute a certain function on the media access device. In some embodiments, the results can be to play a multimedia asset on the media access device. In some embodiments, the results can be to execute a function for an accessory in communication with the media access device.

It will be appreciated that process 600 is illustrative and that variations and modifications are possible. Steps described as sequential may be executed in parallel, order of steps may be varied, and steps may be modified, combined, added or omitted.

Figure 7:
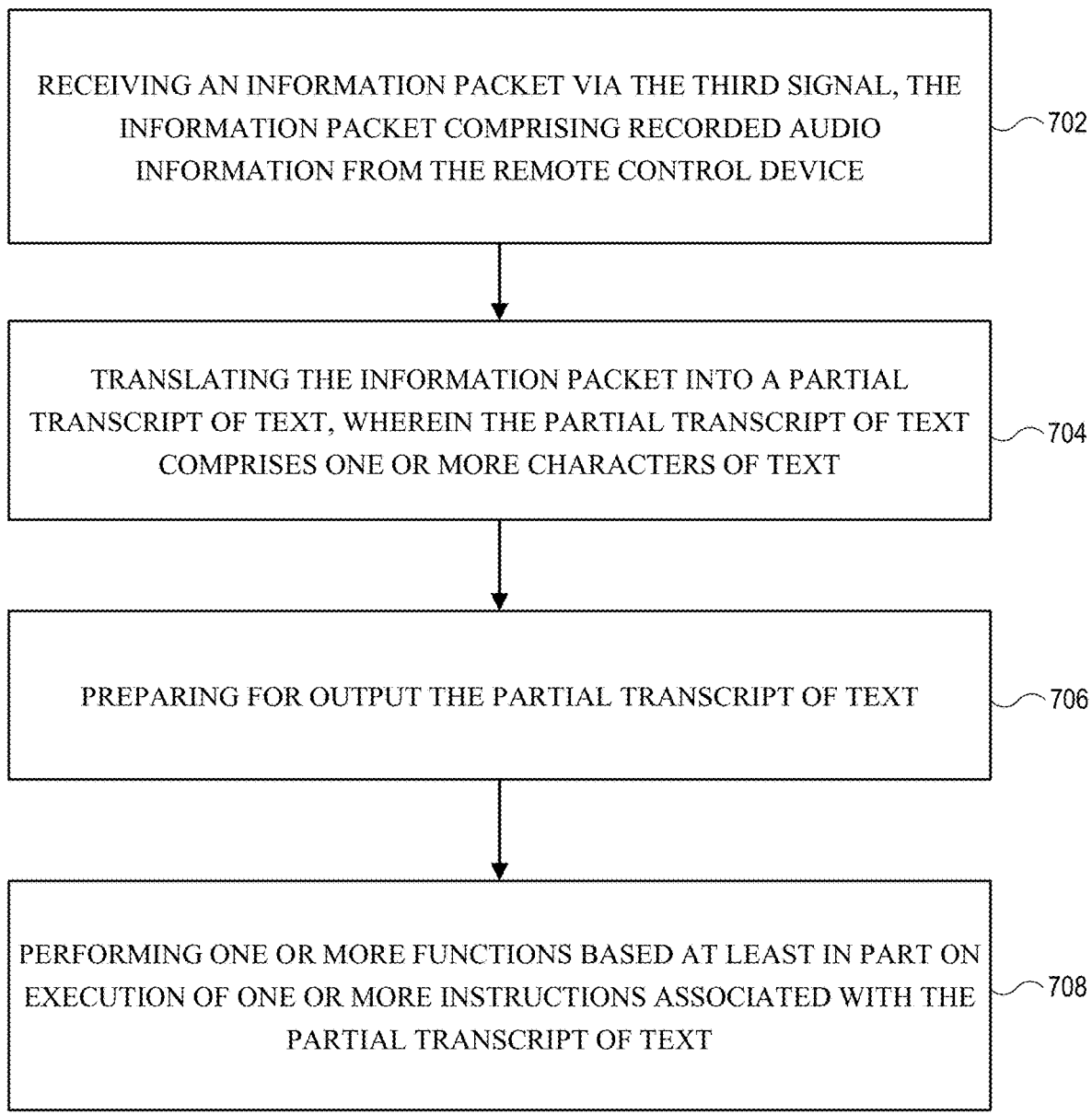
FIG. 7 illustrates another simplified flow diagram for a technique enabling a controller device access a virtual assistant an embodiment of the present disclosure.

FIG. 7 illustrates a simplified flow diagram for a technique of enabling a controller device access a virtual assistant according to another embodiment of the present disclosure.

At 702, the technique includes receiving, by the computing device, an information packet via the third signal. In some embodiments, the information packet can include recorded audio information from the controller.

At 704, the technique includes translating, by the computing device, the information packet into a partial transcript of text, wherein the partial transcript of text includes one or more characters of text.

At 706, the technique includes preparing for output, at the computing device, the partial transcript of text. In some embodiments, the output can include displays on a display screen.

At 708, the technique includes performing, by the computing device, one or more functions based at least in part on execution of one or more instructions associated with the partial transcript of text.

It will be appreciated that process 700 is illustrative and that variations and modifications are possible. Steps described as sequential may be executed in parallel, order of steps may be varied, and steps may be modified, combined, added or omitted.

Figure 8:
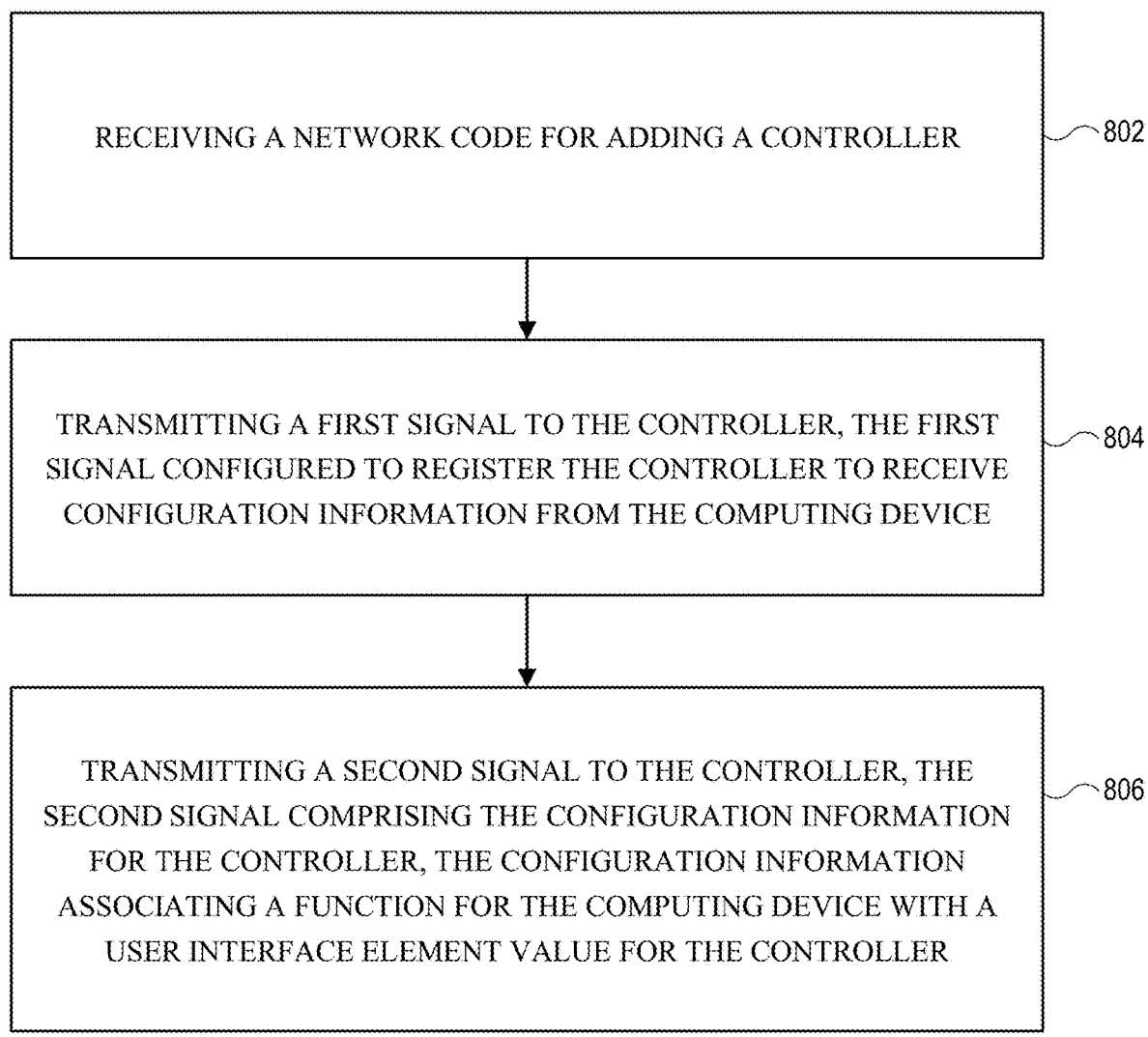
FIG. 8 illustrates a simplified flow diagram for instructions in a computer readable medium for accessory control according to an embodiment of the present disclosure.

FIG. 8 illustrates a simplified flow diagram for instructions 800 in a computer readable medium for accessory control according to an embodiment of the present disclosure. The techniques include a computer-readable medium storing a plurality of instructions that, when executed by one or more processors of a host computing device, cause the one or more processors to perform operations.

At 802, the operations include receiving, by the computing device for a network, a network code for adding a controller. In some embodiments, the network code identified via a user interface of an application for the network.

At 804, the operations include transmitting, by the computing device, a first signal to the controller, the first signal configured to register the controller to receive configuration information from the computing device.

At 806, the operations include transmitting, by the computing device, a second signal to the controller, the second signal including the configuration information for the controller, the configuration information associating a function for the computing device with a user interface element value for the controller.

It will be appreciated that process including computer readable instructions 700 is illustrative and that variations and modifications are possible. Steps described as sequential may be executed in parallel, order of steps may be varied, and steps may be modified, combined, added or omitted.

V. Example Device Architectures

Figure 9:
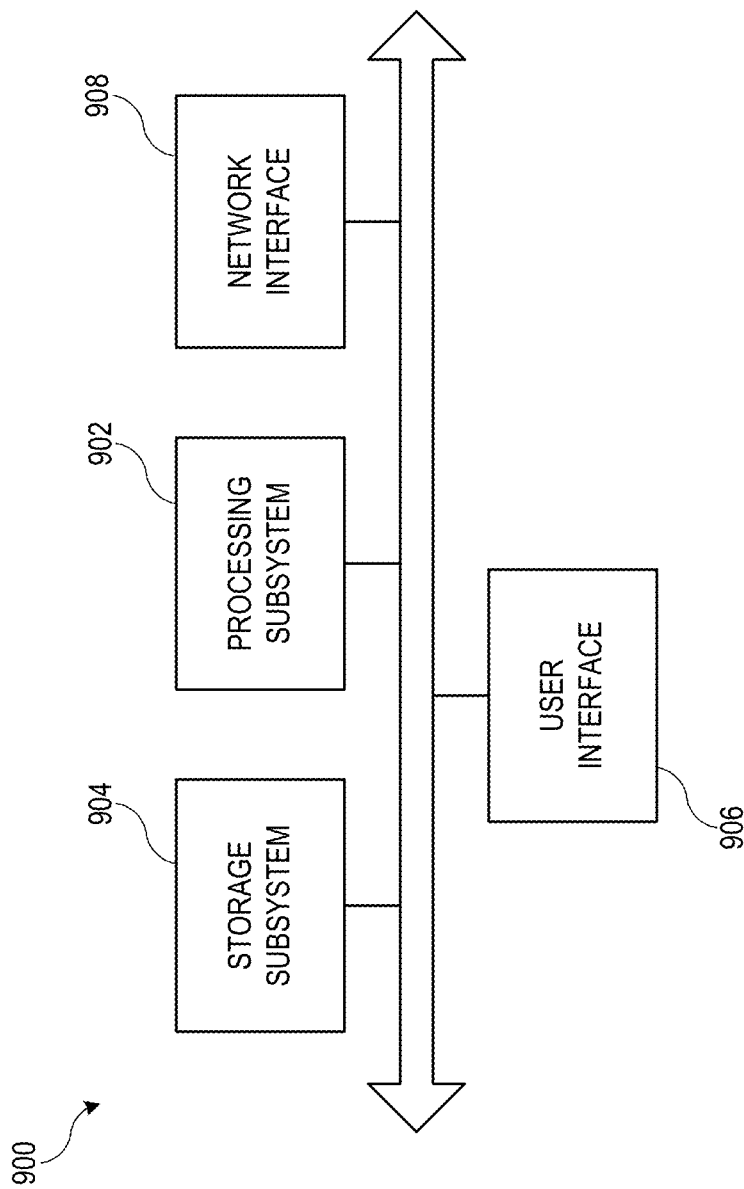
FIG. 9 illustrates a simplified block diagram of a computer system according to an embodiment of the present disclosure.

FIG. 9 shows a simplified block diagram of a computer system 900 according to an embodiment of the present disclosure. In some embodiments, computer system 900 can implement any or all of the functions, behaviors, and capabilities described herein as being performed by a server, as well as other functions, behaviors, and capabilities not expressly described. In some embodiments, other physical instances of computer system 900 can implement any or all of the functions, behaviors, and capabilities described herein as being performed by a controller or an accessory; further examples of controller and accessory implementations are described below. In some embodiments, the computer system can be a media access device.

Computer system 900 can include processing subsystem 902, storage subsystem 904, user interface 906, and network interface 908. Computer system 900 can also include other components (not explicitly shown) such as a power controllers, and other components operable to provide various enhanced capabilities. Computer system 900 can also be implemented in a large-scale architecture such as a scalable server system or server farm that can include many interconnected processors, storage systems and interfaces, capable of processing and responding to high volumes of requests from client devices including controllers and/or accessories.

Storage subsystem 904 can be implemented, e.g., using disk, flash memory, or any other non-transitory storage medium, or a combination of media, and can include volatile and/or non-volatile storage media. In some embodiments, storage subsystem 904 can store one or more application and/or operating system programs to be executed by processing subsystem 902, including programs to implement any or all operations described herein as being performed by any of the servers of relay service 220, as shown in FIG. 2, as well as data associated with such operations In instances where computer system 900 implements a server, storage subsystem 904 can be implemented using network storage technologies and/or other technologies that can manage high-volume data access requests.

User interface 906 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). In some embodiments, a user can operate input devices of user interface 906 to invoke the functionality of computer system 900 and can view and/or hear output from computer system 900 via output devices of user interface 906. In instances where computer system 900 implements a server, user interface 906 can be remotely located with respect to processing subsystem 902 and/or storage subsystem 904.

Processing subsystem 902 can be implemented using one or more integrated circuits, e.g., one or more single-core or multi-core microprocessors or microcontrollers, examples of which are known in the art. In operation, processing subsystem 902 can control the operation of computer system 900. In various embodiments, processing subsystem 902 can execute a variety of programs in response to program code and can maintain multiple concurrently executing programs or processes. At any given time, some or all of the program code to be executed can be resident in processing subsystem 902 and/or in storage media such as storage subsystem 904.

Through suitable programming, processing subsystem 902 can provide various functionality for computer system 900. For example, where computer system 900 implements a server of relay service 220, as shown in FIG. 2, processing subsystem 902 can implement various processes (or portions thereof) described above as being implemented by any or all of certificate server, identity server, accessory courier server, controller courier serve, message passing server(s), pass server, and/or reporting server. Processing subsystem 902 can also execute other programs to control other functions of computer system 900, including programs that may be stored in storage subsystem 904.

Network communication interface 908 can provide voice and/or data communication capability for computer system 900. In some embodiments, network communication interface 908 can include radio frequency (RF) transceiver components for accessing wireless data networks (e.g., using data network technology such as 3G, 4G/LTE, IEEE 802.11 family standards (e.g., Wi-Fi network technology), or other mobile communication technologies, or any combination thereof), components for short-range wireless communication (e.g., using Bluetooth and/or Bluetooth LE standards, NFC, etc.), and/or other components. In some embodiments, network communication interface 908 can provide wired network connectivity (e.g., Ethernet) in addition to or instead of a wireless interface. Network communication interface 908 can be implemented using a combination of hardware (e.g., driver circuits, antennas, modulators/demodulators, encoders/decoders, and other analog and/or digital signal processing circuits) and software components. In some embodiments, network communication interface 908 can support multiple communication channels concurrently, using the same transport or different transports.

It will be appreciated that computer system 900 is illustrative and that variations and modifications are possible. Computer systems including servers, controller devices, and/or accessories can have functionality not described herein (e.g., a controller device may also provide voice communication via cellular telephone networks; ability to interact with the user to provide personal information, play games, access content via the wireless network and/or locally stored content; etc.), and implementations of these devices and servers can include components appropriate to such functionality.

Further, while a computer system is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Figure 10:
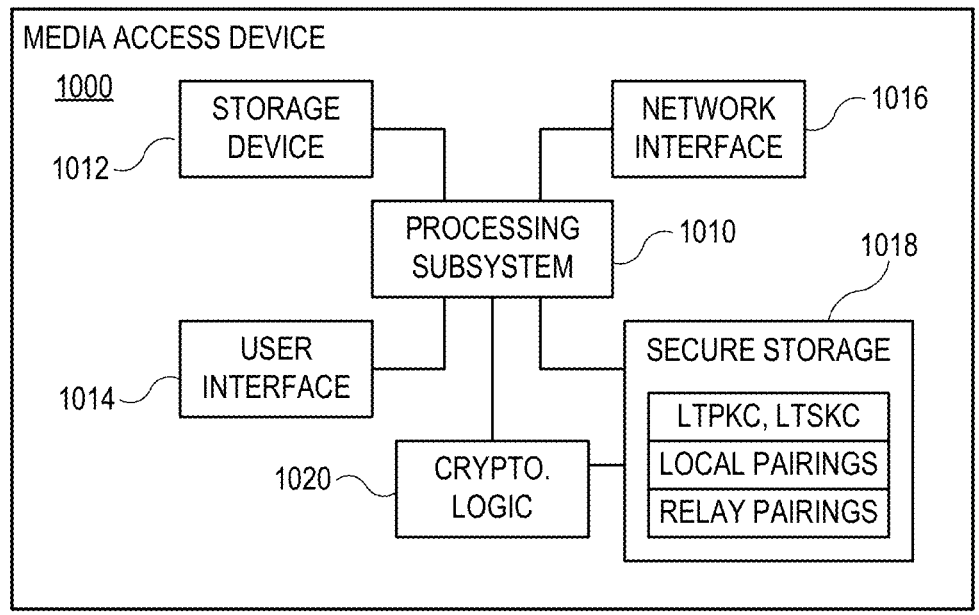
FIG. 10 illustrates a simplified block diagram of a media access device according to an embodiment of the present disclosure.

FIG. 10 shows a simplified block diagram of a media access device 1000 according to an embodiment of the present disclosure. Media access device 1000 can implement any or all of the media access device functions, behaviors, and capabilities described herein, as well as other functions, behaviors, and capabilities not expressly described. Media access device 1000 can include processing subsystem 1010, storage device 1012, user interface 1014, communication interface 1016, secure storage module 1018, and cryptographic logic module 1020. Media access device 1000 can also include other components (not explicitly shown) such as a power controllers, and other components operable to provide various enhanced capabilities.

Storage device 1012 can be implemented, e.g., using disk, flash memory, or any other non-transitory storage medium, or a combination of media, and can include volatile and/or non-volatile media. In some embodiments, storage device 1012 can store one or more application and/or operating system programs to be executed by processing subsystem 1010, including programs to implement various operations described above as being performed by a media access device. Storage device 1012 can also store program code executable to communicate with a relay service 220, as shown in FIG. 2, e.g., as described above. In some embodiments, portions (or all) of the media access device functionality described herein can be implemented in operating system programs rather than applications. In some embodiments, storage device 1012 can also store apps designed for specific accessories or specific categories of accessories (e.g., an IP camera app to manage an IP camera accessory or a security app to interact with door lock accessories). In some embodiments, the storage device 1012 can store digital multimedia content.

User interface 1014 can include input devices such as a touch pad, touch screen, scroll wheel, click wheel, dial, button, switch, keypad, keyboard microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 1014 to invoke the functionality of media access device 1000 and can view and/or hear output from media access device 1000 via output devices of user interface 1014. In some embodiments, a user interface 1014 can be a proprietary remote control. In some embodiments, a user interface 1014, can be implemented as an App for a smartphone, tablet, wearable or other mobile electronic device.

Processing subsystem 1010 can be implemented as one or more integrated circuits, e.g., one or more single-core or multi-core microprocessors or microcontrollers, examples of which are known in the art. In operation, processing system 1010 can control the operation of media access device 1000. In various embodiments, processing subsystem 1010 can execute a variety of programs in response to program code and can maintain multiple concurrently executing programs or processes. At any given time, some or all of the program code to be executed can be resident in processing subsystem 1010 and/or in storage media such as storage device 1012.

Through suitable programming, processing subsystem 1010 can provide various functionality for media access device 1000. For example, in some embodiments, processing subsystem 1010 can implement various processes (or portions thereof) described above as being implemented by a media access device. Processing subsystem 1010 can also execute other programs to control other functions of media access device 1000, including application programs that may be stored in storage device 1012. In some embodiments, these application programs may interact with an accessory, e.g., by generating messages to be sent to the accessory and/or receiving responses from the accessory. Such interactions can be facilitated by an accessory management daemon and/or other operating system processes, e.g., as described above, and can include communicating with the accessory via a relay service 220, as shown in FIG. 2, as described above.

Communication interface 1016 can provide voice and/or data communication capability for media access device 1000. In some embodiments communication interface 1016 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1016 can provide wired network connectivity (e.g., Ethernet) in addition to or instead of a wireless interface. Communication interface 1016 can be implemented using a combination of hardware (e.g., driver circuits, antennas, modulators/demodulators, encoders/decoders, and other analog and/or digital signal processing circuits) and software components. In some embodiments, communication interface 1016 can support multiple communication channels concurrently or at different times, using the same transport or different transports. Thus, for example, media access device 1000 can communicate with accessories via a local channel at some times and via a relay service 220, as shown in FIG. 2, at other times.

Secure storage module 1018 can be an integrated circuit or the like that can securely store cryptographic information for media access device 1000. Examples of information that can be stored within secure storage module 1018 include the media access device's long-term public and secret keys 1022 (LTPKC, LTSKC), a list of local pairings 1024 (e.g., a lookup table that maps a local accessory identifier to an accessory long-term public key (LTPKA) for accessories that have completed a local pair setup or pair add process, e.g., as described above, with media access device 1000), and a list of relay pairings 1026 (e.g., accessory RAs and associated access tokens for accessories that have established a relay pairing, e.g., as described above, with media access device 1000). In some embodiments, pairing information can be stored such that a local pairing 1024 is mapped to the corresponding relay pairing 1026 in instances where both a local pairing and a relay pairing with the accessory have been established.

In some embodiments, cryptographic operations can be implemented in a cryptographic logic module 1020 that communicates with secure storage module 1018. Physically, cryptographic logic module 1020 can be implemented in the same integrated circuit with secure storage module 1018 or a different integrated circuit (e.g., a processor in processing subsystem 1010) as desired. Cryptographic logic module 1020 can include various logic circuits (fixed or programmable as desired) that implement or support cryptographic operations of media access device 1000, including any or all cryptographic operations described above. Secure storage module 1018 and/or cryptographic logic module 1020 can appear as a "black box" to the rest of media access device 1000. Thus, for instance, communication interface 1016 can receive a message in encrypted form that it cannot decrypt and can simply deliver the message to processing subsystem 1010. Processing subsystem 1010 may also be unable to decrypt the message, but it can recognize the message as encrypted and deliver it to cryptographic logic module 1020. Cryptographic logic module 1020 can decrypt the message (e.g., using information extracted from secure storage module 1018) and determine what information to return to processing subsystem 1010. As a result, certain information can be available only within secure storage module 1018 and cryptographic logic module 1020. If secure storage module 1018 and cryptographic logic module 1020 are implemented on a single integrated circuit that executes code only from an internal secure repository, this can make extraction of the information extremely difficult, which can provide a high degree of security. Other implementations are also possible.

Figure 11:
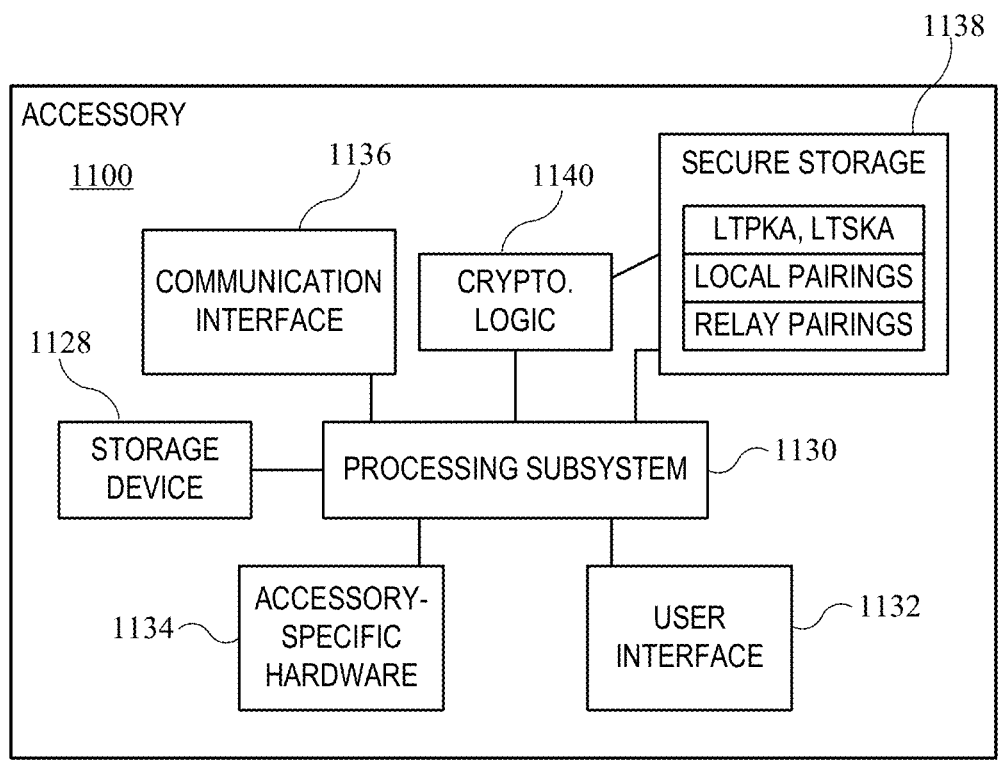
FIG. 11 illustrates a simplified block diagram of an accessory according to an embodiment of the present disclosure.

FIG. 11 shows a simplified block diagram of an accessory 1100 according to an embodiment of the present disclosure. Accessory 1100 can implement any or all of the accessory functions, behaviors, and capabilities described herein, as well as other functions, behaviors, and capabilities not expressly described. Accessory 1100 can include storage device 1128, processing subsystem 1130, user interface 1132, accessory-specific hardware 1134, communication interface 1136, secure storage module 1138, and cryptographic logic module 1140. Accessory 1100 can also include other components (not explicitly shown) such as a battery, power media access devices, and other components operable to provide various enhanced capabilities.

Accessory 1100 is representative of a broad class of accessories that can be operated by a media access device such as controller, and such accessories can vary widely in capability, complexity, and form factor. Various accessories may include components not explicitly shown in FIG. 11, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 1128 can be implemented, e.g., using disk, flash memory, or any other non-transitory storage medium, or a combination of media, and can include volatile and/or non-volatile media. In some embodiments, storage device 1128 can store one or more programs (e.g., firmware) to be executed by processing subsystem 1130, including programs to implement various operations described above as being performed by an accessory, as well as operations related to particular accessory behaviors. Storage device 1128 can also store an accessory object or accessory definition record that can be furnished to controller devices, e.g., during device discovery as described in above-referenced U.S. application Ser. No. 14/614,914. Storage device 1128 can also store accessory state information and any other data that may be used during operation of accessory 1100. Storage device 1128 can also store program code executable to communicate with a relay service 220, as shown in FIG. 2, e.g., as described above.

Processing subsystem 1130 can include, e.g., one or more single-core or multi-core microprocessors and/or microcontrollers executing program code to perform various functions associated with accessory 1100. For example, processing subsystem 1130 can implement various processes (or portions thereof) described above as being implemented by an accessory, e.g., by executing program code stored in storage device 1128. Processing subsystem 1130 can also execute other programs to control other functions of accessory 1100. In some instances programs executed by processing subsystem 1130 can interact with a controller (e.g., controller), e.g., by generating messages to be sent to the controller and/or receiving messages from the controller. In some instances, the messages can be sent and/or received using a relay service 220, as shown in FIG. 2, as described above.

User interface 1132 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 1100, a user can operate input devices of user interface 1132 to invoke functionality of accessory 1100 and can view and/or hear output from accessory 1100 via output devices of user interface 1132. Some accessories may provide a minimal or no user interface. Where the accessory does not have a user interface, a user can still interact with the accessory using a controller (e.g., controller 1200).

Accessory-specific hardware 1134 can include any other components that may be present in accessory 1100 to enable its functionality. For example, in various embodiments accessory-specific hardware 1134 can include one or more storage devices using fixed or removable storage media; GPS receiver; power supply and/or power management circuitry; a camera; a microphone; one or more actuators; control switches; environmental sensors (e.g., temperature sensor, pressure sensor, accelerometer, chemical sensor, etc.); and so on. It is to be understood that any type of accessory functionality can be supported by providing appropriate accessory-specific hardware 1134 and that accessory-specific hardware can include mechanical as well as electrical or electronic components.

Communication interface 1136 can provide voice and/or data communication capability for accessory 1100. In some embodiments communication interface 1136 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1136 can provide wired network connectivity (e.g., Ethernet) in addition to or instead of a wireless interface. Communication interface 1136 can be implemented using a combination of hardware (e.g., driver circuits, antennas, modulators/demodulators, encoders/decoders, and other analog and/or digital signal processing circuits) and software components. In some embodiments, communication interface 1136 can support multiple communication channels concurrently or at different times, using the same transport or different transports. Thus, for example, accessory 1100 can communicate with a controller via a local channel at some times and via a relay service 220, as shown in FIG. 2, at other times.

Secure storage module 1138 can be an integrated circuit or the like that can securely store cryptographic information for accessory 1100. Examples of information that can be stored within secure storage module 1138 include the accessory's long-term public and secret keys 1142 (LTPKA, LTSKA), a list of local pairings 1144 (e.g., a lookup table that maps a local controller identifier to a controller long-term public key (LTPKC) for controllers that have completed a local pair setup or pair add process, e.g., as described above, with accessory 1100), and a list of relay pairings 1146 (e.g., controller RAs and associated access tokens for controllers that have established a relay pairing, e.g., as described above, with accessory 1100). In some embodiments, pairing information can be stored such that a local pairing 1144 is mapped to the corresponding relay pairing 1146 in instances where both a local pairing and a relay pairing with the controller have been established. In some embodiments, secure storage module 4038 can be omitted; keys and lists of paired controllers can be stored in storage device 1128.

In some embodiments, cryptographic operations can be implemented in a cryptographic logic module 1140 that communicates with secure storage module 1138. Physically, cryptographic logic module 1140 can be implemented in the same integrated circuit with secure storage module 1138 or a different integrated circuit (e.g., a processor in processing subsystem 1130) as desired. Cryptographic logic module 1140 can include various logic circuits (fixed or programmable as desired) that implement or support cryptographic operations of accessory 1100, including any or all cryptographic operations described above. Secure storage module 1138 and/or cryptographic logic module 1140 can appear as a "black box" to the rest of accessory 1100. Thus, for instance, communication interface 1136 can receive a message in encrypted form that it cannot decrypt and can simply deliver the message to processing subsystem 1130. Processing subsystem 1130 may also be unable to decrypt the message, but it can recognize the message as encrypted and deliver it to cryptographic logic module 1140. Cryptographic logic module 1140 can decrypt the message (e.g., using information extracted from secure storage module 1138) and determine what information to return to processing subsystem 1130. As a result, certain information can be available only within secure storage module 1138 and cryptographic logic module 1140. If secure storage module 1138 and cryptographic logic module 1140 are implemented on a single integrated circuit that executes code only from an internal secure repository, this can make extraction of the information extremely difficult, which can provide a high degree of security. Other implementations are also possible.

Accessory 1100 can be any electronic apparatus that interacts with controller 1200. In some embodiments, controller 1200 can provide remote control over operations of accessory 1100 as described below. For example controller 1200 can provide a remote user interface for accessory 1100 that can include both input and output controls (e.g., a display screen to display current status information obtained from accessory 1100 and an input control such as a touchscreen overlay to allow changes to the status information). Controller 1200 in various embodiments can control any function of accessory 1100 and can also receive data from accessory 1100, via a local channel or a relay service 220, as shown in FIG. 2.

Figure 12:
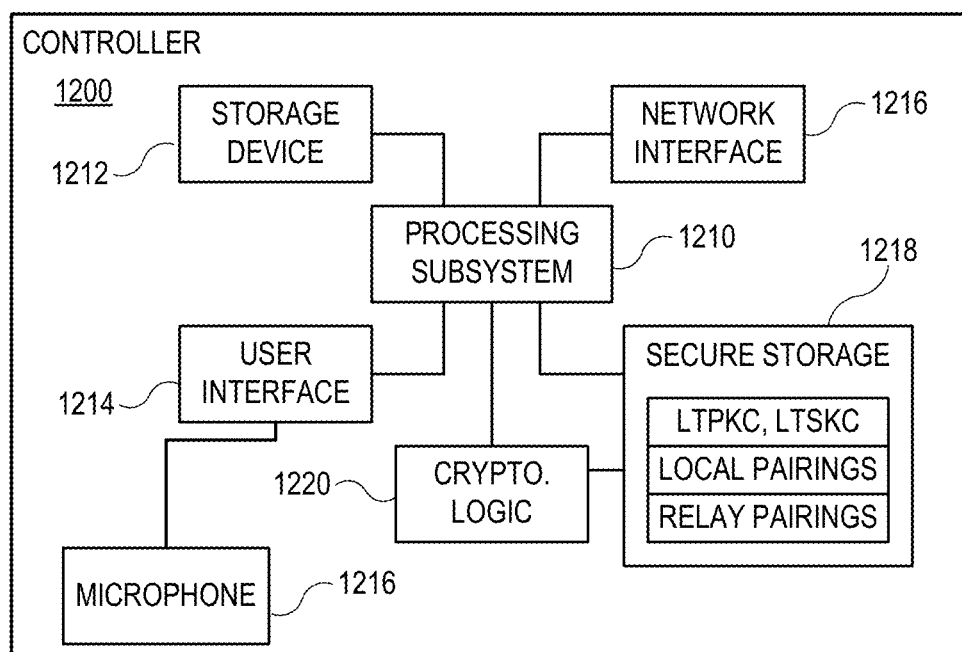
FIG. 12 illustrates a simplified block diagram of a controller according to an embodiment of the present disclosure.

FIG. 12 shows a simplified block diagram of a controller 1200 according to an embodiment of the present disclosure. In some embodiments, controller 1200 can implement any or all of the functions, behaviors, and capabilities described herein as being performed by a controller, as well as other functions, behaviors, and capabilities not expressly described. Controller 1200 can include processing subsystem 1210, storage device 1212, user interface 1214, communication interface 1216, secure storage module 1218, and cryptographic logic module 1220. Controller 1200 can also include other components (not explicitly shown) such as a battery, power controllers, and other components operable to provide various enhanced capabilities. In various embodiments, controller 1200 can be implemented in a desktop computer, laptop computer, tablet computer, smart phone, other mobile phone, wearable computing device, or other systems having any desired form factor. Further, as noted above, controller 1200 can be implemented partly in a base station and partly in a mobile unit that communicates with the base station and provides a user interface.

Storage device 1212 can be implemented, e.g., using disk, flash memory, or any other non-transitory storage medium, or a combination of media, and can include volatile and/or non-volatile media. In some embodiments, storage device 1212 can store one or more application and/or operating system programs to be executed by processing subsystem 1210, including programs to implement various operations described above as being performed by a controller. For example, storage device 1012 can store a uniform controller application that can read an accessory description record and generate a graphical user interface for controlling the accessory based on information therein (e.g., as described in above-referenced U.S. application Ser. No. 14/614,114). Storage device 1212 can also store program code executable to communicate with a relay service 220, as shown in FIG. 2, e.g., as described above. In some embodiments, portions (or all) of the controller functionality described herein can be implemented in operating system programs rather than applications. In some embodiments, storage device 1212 can also store apps designed for specific accessories or specific categories of accessories (e.g., an IP camera app to manage an IP camera accessory or a security app to interact with door lock accessories).

User interface 1214 can include input devices such as a touch pad, touch screen, scroll wheel, click wheel, dial, button, switch, keypad, microphone 1216, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 1214 to invoke the functionality of controller 1200 and can view and/or hear output from controller 1200 via output devices of user interface 1214.

Processing subsystem 1210 can be implemented as one or more integrated circuits, e.g., one or more single-core or multi-core microprocessors or microcontrollers, examples of which are known in the art. In operation, processing system 1210 can control the operation of controller 1200. In various embodiments, processing subsystem 1210 can execute a variety of programs in response to program code and can maintain multiple concurrently executing programs or processes. At any given time, some or all of the program code to be executed can be resident in processing subsystem 1210 and/or in storage media such as storage device 1212.

Through suitable programming, processing subsystem 1210 can provide various functionality for controller 1200. For example, in some embodiments, processing subsystem 1210 can implement various processes (or portions thereof) described above as being implemented by a controller. Processing subsystem 1210 can also execute other programs to control other functions of controller 1200, including application programs that may be stored in storage device 1212. In some embodiments, these application programs may interact with an accessory, e.g., by generating messages to be sent to the accessory and/or receiving responses from the accessory. Such interactions can be facilitated by an accessory management daemon and/or other operating system processes, e.g., as described above, and can include communicating with the accessory via a relay service 220, as shown in FIG. 2, as described above.

Communication interface 1216 can provide voice and/or data communication capability for controller 1200. In some embodiments communication interface 1216 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1216 can provide wired network connectivity (e.g., Ethernet) in addition to or instead of a wireless interface. Communication interface 1216 can be implemented using a combination of hardware (e.g., driver circuits, antennas, modulators/demodulators, encoders/decoders, and other analog and/or digital signal processing circuits) and software components. In some embodiments, communication interface 1216 can support multiple communication channels concurrently or at different times, using the same transport or different transports. Thus, for example, controller 1200 can communicate with accessories via a local channel at some times and via a relay service 220, as shown in FIG. 2, at other times.

Secure storage module 1218 can be an integrated circuit or the like that can securely store cryptographic information for controller 1200. Examples of information that can be stored within secure storage module 1218 include the controller's long-term public and secret keys 1222 (LTPKC, LTSKC), a list of local pairings 1224 (e.g., a lookup table that maps a local accessory identifier to an accessory long-term public key (LTPKA) for accessories that have completed a local pair setup or pair add process, e.g., as described above, with controller 1200), and a list of relay pairings 1226 (e.g., accessory RAs and associated access tokens for accessories that have established a relay pairing, e.g., as described above, with controller 1200). In some embodiments, pairing information can be stored such that a local pairing 1224 is mapped to the corresponding relay pairing 1226 in instances where both a local pairing and a relay pairing with the accessory have been established.

In some embodiments, cryptographic operations can be implemented in a cryptographic logic module 1220 that communicates with secure storage module 1218. Physically, cryptographic logic module 1220 can be implemented in the same integrated circuit with secure storage module 1218 or a different integrated circuit (e.g., a processor in processing subsystem 1210) as desired. Cryptographic logic module 1220 can include various logic circuits (fixed or programmable as desired) that implement or support cryptographic operations of controller 1200, including any or all cryptographic operations described above. Secure storage module 1218 and/or cryptographic logic module 1220 can appear as a "black box" to the rest of controller 1200. Thus, for instance, communication interface 1216 can receive a message in encrypted form that it cannot decrypt and can simply deliver the message to processing subsystem 1210. Processing subsystem 1210 may also be unable to decrypt the message, but it can recognize the message as encrypted and deliver it to cryptographic logic module 1220. Cryptographic logic module 1220 can decrypt the message (e.g., using information extracted from secure storage module 1218) and determine what information to return to processing subsystem 1210. As a result, certain information can be available only within secure storage module 1218 and cryptographic logic module 1220. If secure storage module 1218 and cryptographic logic module 1220 are implemented on a single integrated circuit that executes code only from an internal secure repository, this can make extraction of the information extremely difficult, which can provide a high degree of security. Other implementations are also possible.

Further, while a controller is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Controllers and accessories described herein can be implemented in electronic devices that can be of generally conventional design. Such devices can be adapted to communicate using a uniform accessory protocol that supports command-and-control operations by which a controller (a first electronic device) can control operation of an accessory (a second electronic device). In some instances, a device can combine features or aspects of a controller and an accessory, e.g., in the case of a proxy as described above.

It will be appreciated that the system configurations and components described herein are illustrative and that variations and modifications are possible. It is to be understood that an implementation of controller 1200 can perform all operations described above as being performed by a media access device and that an implementation of accessory 1100 can perform any or all operations described above as being performed by an accessory. A proxy, bridge, tunnel, or coordinator can combine components of controller 1200 and accessory 1100, using the same hardware or different hardware as desired. The media access device and/or accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular accessory can have some functionality that is not accessible or invocable via a particular media access device but is accessible via another controller or by interacting directly with the accessory.

Further, while the media access device and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

As described above, one aspect of the present technology is the gathering and use of data available from various sources for use in a home networking environment. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to control home network devices. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of home network control, the present technology can be configured to allow users to select to "opt in" or "opt out" of participation in the collection of personal information data during registration for services or anytime thereafter. In another example, users can select not to provide person information for home network setup. mood-associated data for targeted content delivery services. In yet another example, users can select to limit the amount of personal data is maintained by the home network. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the home network, or publicly available information.

Thus, although the disclosure has been described with respect to specific embodiments, it will be appreciated that the disclosure is intended to cover all modifications and equivalents within the scope of the following claims.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims), are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise be read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
   receiving, by a computing device connected to a network, a network code for adding a controller, the computing device comprising a display that presents a user interface element for controlling one or more accessories that are wirelessly connected to the computing device;
   transmitting, by the computing device, a first signal to the controller, the first signal configured to register the controller to receive configuration information from the computing device;
   transmitting, by the computing device, a second signal to the controller, the second signal comprising the configuration information for the controller, the configuration information associating a function of the computing device with the user interface element for the controller;
   receiving, by the computing device, a third signal from the controller, the third signal indicating interaction with a selected user interface element on the controller;
   authorizing the controller to control the one or more accessories of various types that are wirelessly connected to the computing device;
   synchronizing the control of the one or more accessories such that a command from the controller will perform a related function for each of a same type of accessory; and
   performing, by the computing device, the function associated with the selected user interface element.

2. The method of claim 1, further comprising:
   receiving, by the computing device, information via the third signal, the information comprising audio information captured by the controller;
   translating, by the computing device, the information into a partial transcript of text, wherein the partial transcript of text comprises one or more characters of text; and
   performing, by the computing device, one or more functions based at least in part on execution of one or more instructions associated with the partial transcript of text.

3. The method of claim 2, further comprising:
   preparing for output, by the computing device, the partial transcript of text, wherein the output comprises at least one of displaying the partial transcript of text on a display or announcing the partial transcript of text via a speaker.

4. The method of claim 1, further comprising:
   identifying, by the computing device, a change in the configuration information for the computing device; and
   transmitting, by the computing device, a fourth signal that includes revised configuration information for associating functions of the computing device with the user interface element for the controller.

5. The method of claim 1, further comprising causing an interface of the controller to display representations of the one or more accessories on a display of the controller.

6. The method of claim 1, further comprising:
   receiving, from the controller, authorization for the computing device to control one or more accessories of various types that are wirelessly connected to the controller;
   synchronizing the control of the one or more accessories such that a command from the computing device will perform a related function for each of a same type of accessory; and
   providing an interface for a user to select the one or more accessories on the computing device.

7. The method of claim 1, further comprising:
   receiving, by the computing device, a request from the controller to open a channel;
   opening, by the computing device, the channel for reception of the third signal containing data;
   transmitting, by the computing device, a fifth signal to the controller, the fifth signal comprising a transmit identifier, a status, an address, and a port identifier; and
   receiving, by the computing device, information via the third signal, the information including data from the controller.

8. A computer-readable medium storing a plurality of instructions that, when executed by one or more processors of a computing device, cause the one or more processors to perform operations comprising:
   receiving, by the computing device for a network, a network code for adding a controller, the network code identified via a user interface of an application for the network, the controller comprising a display that presents a user interface element for controlling one or more accessories that are wirelessly connected to the computing device;
   transmitting, by the computing device, a first signal to the controller, the first signal configured to register the controller to receive configuration information from the computing device;
   transmitting, by the computing device, a second signal to the controller, the second signal comprising the configuration information for the controller, the configuration information associating a function for the computing device with the user interface element for the controller;
   receiving, by the computing device, a third signal from the controller, the third signal indicating interaction with a selected user interface element on the controller;
   authorizing the controller to control the one or more accessories of various types that are wirelessly connected to the computing device;
   synchronizing the control of the one or more accessories such that a command from the controller will perform a related function for each of a same type of accessory; and
   performing, by the computing device, the function associated with the selected user interface element.

9. The computer-readable medium of claim 8, further comprising:
   receiving, by the computing device, a fourth signal from the controller, the third signal comprising a signal indicating activation of a selected user interface element on the controller; and
   performing, by the computing device, the function associated with the selected user interface element.

10. The computer-readable medium of claim 8, further comprising:
    receiving, by the computing device, information via the third signal, the information comprising audio information captured by the controller;
    transcribing, by the computing device, the audio information into a partial transcript of text, wherein the partial transcript of text comprises one or more characters of text; and
    performing, by the computing device, one or more functions based at least in part on execution of one or more instructions associated with the partial transcript of text.

11. The computer-readable medium of claim 8, further comprising:
  identifying, by the computing device, a change in the configuration information for the computing device; and
  transmitting, by the computing device, a fourth signal that includes revised configuration information for associating functions of the computing device with the user interface element for the controller.

12. The computer-readable medium of claim 8, further comprising:
  receiving, from the controller, authorization for the computing device to control one or more accessories of various types that are wirelessly connected to the controller;
  synchronizing the control of the one or more accessories such that a command from the controller will perform a related function for each of a same type of accessory; and
  providing an interface for a user to select the one or more accessories on the controller.

13. The computer-readable medium of claim 8, further comprising receiving authorization information configured to authorize the computing device to control one or more proprietary accessories of various types that are wirelessly connected to the controller.

14. The computer-readable medium of claim 8, further comprising:
  receiving, by the computing device, a request from the controller to open a channel;
  opening, by the computing device, the channel for reception of the third signal comprising audio information;
  transmitting, by the computing device, a fifth signal to the controller, the fifth signal comprising a transmit identifier, a status, an address, and a port identifier; and
  receiving, by the computing device, an information via the third signal, the information including data from the controller.

15. A computing device for a network, comprising:
  one or more memories; and
  one or more processors in communication with the one or more memories and configured to execute instructions stored in the one or more memories to:
  receive a network code for adding a controller, the network code identified via a user interface of an application for the network;
  transmit a first signal to the controller, the first signal configured to register the controller to receive configuration information from the computing device;
  transmit a second signal to the controller, the second signal comprising the configuration information for the controller, the configuration information associating a function for the computing device with a user interface element value for the controller;
  receive a third signal from the controller, the third signal comprising a signal indicating activation of a selected user interface element on the controller
  perform the function associated with the selected user interface element;
  identify a change in the configuration information for the computing device; and
  transmit a fourth signal that includes revised configuration information for associating functions of the computing device with the user interface element value for the controller.

16. The computing device of claim 15, wherein the one or more processors are further configured to execute the instructions to:
  receive information via the third signal, the information comprising recorded audio information from the controller;
  transcribe the information into a partial transcript of text, wherein the partial transcript of text comprises one or more characters of text;
  prepare for display the partial transcript of text; and
  perform the function associated with the selected user interface element.

17. The computing device of claim 15, wherein the one or more processors are further configured to execute the instructions to:
  receive, from the controller, authorization for the computing device to control one or more accessories of various types that are wirelessly connected to the controller;
  synchronize the control of the one or more accessories such that a command from the computing device will perform a related function for each of a same type of accessory; and
  provide an interface for a user to select the one or more accessories on the computing device.

* * * * *